United States Patent
Boudris et al.

(10) Patent No.: US 6,886,018 B1
(45) Date of Patent: Apr. 26, 2005

(54) DATA PROCESSING TECHNIQUE FOR FORMATTING DATA FILES THAT ARE SUBJECTED TO A HIGH VOLUME OF CHANGES

(75) Inventors: Edward J. Boudris, Mequon, WI (US); Brian K. Schumacher, Oostburg, WI (US)

(73) Assignee: Metavante Corporation, Brown Deer, WI (US)

( * ) Notice: Subject to any disclaimer, the term of this patent is extended or adjusted under 35 U.S.C. 154(b) by 569 days.

(21) Appl. No.: 09/972,075

(22) Filed: Oct. 5, 2001

(51) Int. Cl.[7] .............................................. G06F 17/00
(52) U.S. Cl. ........................ 707/203; 707/1; 707/101; 707/205
(58) Field of Search .......................... 707/1, 101, 203, 707/205; 711/5, 111, 115, 132

(56) References Cited

U.S. PATENT DOCUMENTS

| | | | |
|---|---|---|---|
| 4,951,196 A | | 8/1990 | Jackson |
| 5,331,591 A | * | 7/1994 | Clifton ........................ 365/182 |
| 5,548,751 A | | 8/1996 | Ryu et al. |
| 5,557,780 A | | 9/1996 | Edwards et al. |
| 5,608,874 A | | 3/1997 | Ogawa et al. |
| 5,806,078 A | * | 9/1998 | Hug et al. ................... 715/511 |
| 5,878,419 A | | 3/1999 | Carter |
| 5,943,683 A | | 8/1999 | Yamaguchi |
| 5,974,427 A | * | 10/1999 | Reiter ......................... 707/203 |
| 6,052,448 A | | 4/2000 | Janning |
| 6,216,203 B1 | | 4/2001 | Yamaguchi |
| 6,671,757 B1 | * | 12/2003 | Multer et al. ................ 710/100 |

\* cited by examiner

Primary Examiner—Safet Metjahic
Assistant Examiner—Haythim Alaubaidi
(74) Attorney, Agent, or Firm—Reinhart Boerner Van Deuren s.c.

(57) ABSTRACT

A system for processing a data file which includes versioned records of a fixed length, each record having one or more data fields and a reserve area for accommodating a change in the record format by creating a further field using a portion of the reserve area such that the length of the record is not changed. Additional records may be added to the record set to accommodate new or expanded data fields that exceed the fixed length of the records. Each record of the data file has a version number. The system includes an input vertical stack processor for transitioning previous versions of the records into a current version of the record for processing by an application processor. An output vertical stack processor creates outbound versioned records including the current version and all previous versions for each record of the data file.

18 Claims, 18 Drawing Sheets

FIG. 5

Record Type 01 - File Header Record

| Rec ID | Set ID | Ver No | File Header Data | File Header Record Free Space |
|---|---|---|---|---|
| 01 | 01 | 01 | | |

81, 83, 82, 84, 85 — 71

70

Record Type 02 - Batch Header Record

| Rec ID | Set ID | Ver No | Batch Header Data | Batch Header Free Space |
|---|---|---|---|---|
| 02 | 01 | 01 | | |

86, 87 — 72

Record Type 03 - Detail 01 Record - Version 01

| Rec ID | Set ID | Ver No | Fld A | Fld. B | Fld. C | Fld. D | Fld. E | Fld F | Detail 01 Free Space |
|---|---|---|---|---|---|---|---|---|---|
| 03 | 01 | 01 | | | | | | | |

Record Type 03 - Detail 01 - Version 01 - Record Data

88 — 73

Record Type 03 - Detail 02 Record - Version 01

| Rec ID | Set ID | Ver No | Fld. K | Fld. L | Fld. M | Fld. N | Detail 02 Free Space |
|---|---|---|---|---|---|---|---|
| 03 | 02 | 01 | | | | | |

Record Type 03 - Detail 02 - Version 01 - Record Data

89 — 74

Record Type 03 - Detail 03 Record - Version 01

| Rec ID | Set ID | Ver No | Fld. S | Fld. T | Detail 03 Free Space |
|---|---|---|---|---|---|
| 03 | 03 | 01 | | | |

Record Type 03 - Detail 03 - Version 01 - Record Data

90 — 75

Record Type 08 - Batch Trailer Record

| Rec ID | Set ID | Ver No | Batch Trailer Data | Batch Trailer Record Free Space |
|---|---|---|---|---|
| 08 | 01 | 01 | | |

91, 92 — 76

Record Type 09 - File Trailer Record

| Rec ID | Set ID | Ver No | File Trailer Data | File Trailer Record Free Space |
|---|---|---|---|---|
| 09 | 01 | 01 | | |

93, 94 — 77

FIG. 6
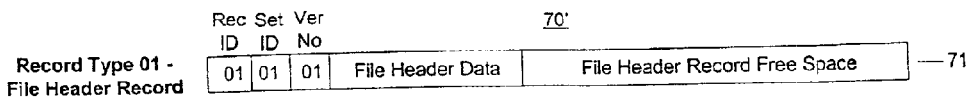
Record Type 01 - File Header Record
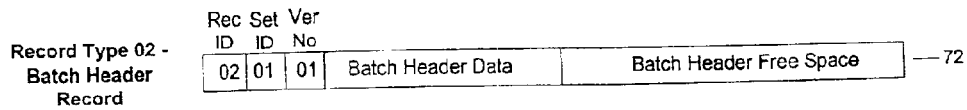
Record Type 02 - Batch Header Record
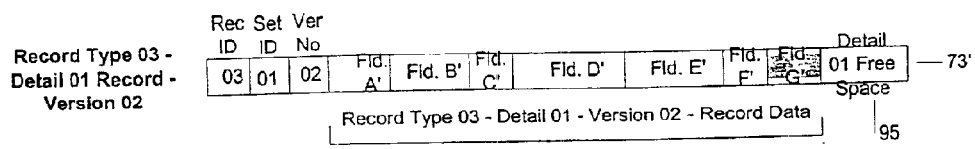
Record Type 03 - Detail 01 Record - Version 02
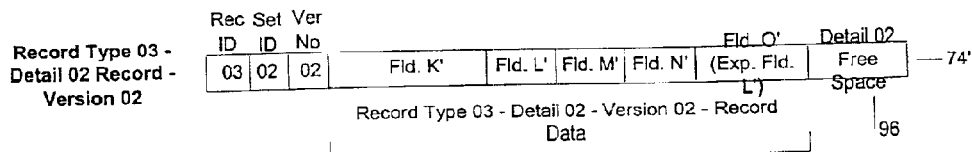
Record Type 03 - Detail 02 Record - Version 02
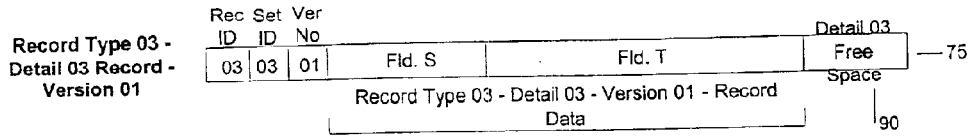
Record Type 03 - Detail 03 Record - Version 01
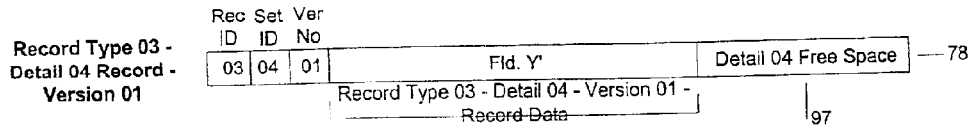
Record Type 03 - Detail 04 Record - Version 01
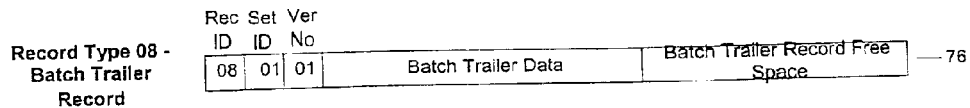
Record Type 08 - Batch Trailer Record
Record Type 09 - File Trailer Record

Input Buffer Area

| Rec ID | Set ID | Ver No | |
|---|---|---|---|
| | | | |

320

Static Memory Area Maps

| | Rec ID | Set ID | Ver No | | | | | | | | |
|---|---|---|---|---|---|---|---|---|---|---|---|
| 300 | 01 | 01 | 01 | File Header Data | | | File Header Record Free Space | | | | (Record 71) |
| 301 | 03 | 01 | 01 | Fld. A | Fld. B | Fld. C | Fld. D | Fld. E | Fld. F | Detail 01 Free Space | (Record 73) |
| 302 | 03 | 01 | 02 | Fld. A' | Fld. B' | Fld. C' | Fld. D' | Fld. E' | Fld. F' | Fld. G' | Det 01 Fr Spc | (Record 73') |
| 303 | 03 | 02 | 01 | Fld. K | | Fld. L | Fld. M | Fld. N | Detail 02 Free Space | | (Record 74) |
| 304 | 03 | 02 | 02 | Fld. K' | | Fld. L' | Fld. M' | Fld. N' | Fld. O' (Exp. Fld. L') | Det 02 Fr Spc | (Record 74') |

Work Area Map

| | Rec ID | Set ID | Ver No | | | | | | | |
|---|---|---|---|---|---|---|---|---|---|---|
| 310 | 01 | 01 | 01 | File Header Data | | | File Header Record Free Space | | | |
| 311 | 03 | 01 | 01 | Fld. A | Fld. B | Fld. C | Fld. D | Fld. E | Fld. F | Detail 01 Free Space |
| 312 | 03 | 01 | 02 | Fld. A' | Fld. B' | Fld. C' | Fld. D' | Fld. E' | Fld. F' | Fld. G' | Det 01 Fr Spc |
| 313 | 03 | 02 | 01 | Fld. K | | Fld. L | Fld. M | Fld. N | Detail 02 Free Space | |
| 314 | 03 | 02 | 02 | Fld. K' | | Fld. L' | Fld. M' | Fld. N' | Fld. O' (Exp. Fld. L') | Det 02 Fr Spc |

Output Buffer Area

| Rec ID | Set ID | Ver No | |
|---|---|---|---|
| | | | |

DATA PROCESSING TECHNIQUE FOR FORMATTING DATA FILES THAT ARE SUBJECTED TO A HIGH VOLUME OF CHANGES

BACKGROUND OF THE INVENTION

This invention relates to data processing, and more particularly, to a method and system for formatting data files that are subjected to a high volume of changes.

In many applications, there is a need for formatting data files that are subjected to a high volume of changes. One such application is in the banking industry wherein financial data and transactions from many banks or other financial institutions are transmitted to a data processing service provider for processing and the data processing service provider returns to the banks and financial institutions reports and files relating to the financial data that has been processed. Generally, financial data to be processed is provided by a very large number of banks, with typically hundreds of banks providing account transaction information to be processed on a daily basis. Thus, the data processing service provider accepts files from a large number of sources of data and distribute files to a large number of targets.

Formatted data files typically are used in the transmission of financial data, with the structure of the formatted files being agreed upon in advance by parties to the processing configuration. The maximum length of the file records that can be specified is a function of transmission protocol used, and, as an example, may be limited to no more than about two hundred fifty bytes.

However, change is inevitable. When transaction files are subject to rapid and high volumes of change, the task of announcing the change to all of the client banks and having the corresponding changes implemented simultaneously by all of the client banks is, for all practical purposes, impossible. On the one hand, if one client bank of a large number of client banks desires a change in format for one or more records, it can be difficult, if not impossible to convince other client banks to make that change. Even if all of the client banks were willing to make the change, it would be difficult, and essentially impossible, to get all of the client banks to change over to the new format at the same time. Moreover, most client banks do not want to make changes in format for the sole purpose of accommodating features pertaining to one or more other client banks.

There are several other options for accommodating increase in the size of records. For example, parallel files can be created, one with the old file format and a second with the new format. Another option is to create a second file to contain the new or expanded fields.

In most known prior art transaction interface systems, changes in format of a record are accommodated by expanding the size of the record. However, eventually, as the changed records increase in size, the maximum size supported by the transmission protocol is reached, thus limiting the changes that can be made.

SUMMARY OF THE INVENTION

The present invention provides a method and system for processing a data file that includes a plurality of input records which are of a fixed length. The method and system allow data sources and/or destinations to ignore changes or to implement changes when convenient so that the changes can be implemented with minimum affect on the users.

The method in accordance with the invention comprises the steps of reading at least one of the input records to obtain from the input record a version number for the record. The version number is used to determine if the record is a current version or a previous version. If the record is a previous version, the record is transitioned to a current version of the record by moving the record to a first work area of a memory. The first work area defines the data fields for the previous version record. Then, a second memory work area is initialized with default values for the current version of the record. The default values are contained in data fields of the current version static map of the record. Then, the data contained in the data fields of the record in the first memory work area are moved to the corresponding data fields of the current version of the record in the second memory work area. As a result, the second memory work area contains the input record transitioned to the current version of the record along with default values for fields not present on the original input record.

Further in accordance with the invention, there is provided a system for processing a data file that includes a plurality of versioned input records which are of a fixed length. The system comprises an input vertical stack processor for transitioning a previous version of at least one of the input records into a current version of the record for use in creating an application input file. The system further includes an application system or processor for processing the application input file and producing a current version of a record. In one embodiment, the system further comprises an output vertical stack processor for writing the current version, including any previous record version data, of each record to a destination file. The output vertical stack processor also can supplement, when required, data contained in at least one record with data for at least one previous version of that record. The current version of one or more records of the data file The input and output vertical stack processors may work with the same or different application systems or processors.

In one embodiment of a method for formatting a data file that includes a plurality of records, a fixed length is established for the records of the data file. Then, for each record, a data receiving portion is defined which includes at least one field containing data and a reserve area of a given length for accommodating a change in the record format of a first version of one of the records by creating a further field of a given length using at least a portion of the reserve area. Then, a version number is assigned to each record of the data file to indicate whether the record is an original version or a changed version.

The method and system of the present invention provides for increasing the amount of data associated with a given file by adding new optional records thereby creating a "set" of file records. In one embodiment, this is accomplished by providing a set of transaction segments arranged as separate records, introducing the concept of downstream introduction of additional segments, as required, by the increasing functionality of the target application systems.

In accordance with a further aspect of the invention, the method and system produce versioned sets of file records, allowing individual records to grow both horizontally by using reserved unused space and vertically by adding additional records to the set without all existing users having to make synchronized changes. The initial release of an interface requires neither multiple records nor reserved space in the "file". By providing versioned sets of records, changes for one user can be implemented with no effect on the remaining users. Thus, users do not have to comply with a rigid implementation date. An important advantage is that this allows change for a single user without coordinating the remainder of the user community. Other members of the user community are free to adapt to changes in their own time frame.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 5 illustrates original version records for a file;

FIG. 6 illustrates new version records for the file illustrated in FIG. 5 after modification to add new versions of some of the records;

FIG. 7 is simplified representation of a portion of a memory containing static memory area maps and work area maps for some of the records of the files shown in FIGS. 5 and 6;

DETAILED DESCRIPTION OF THE PREFERRED EMBODIMENTS

Figure 1:
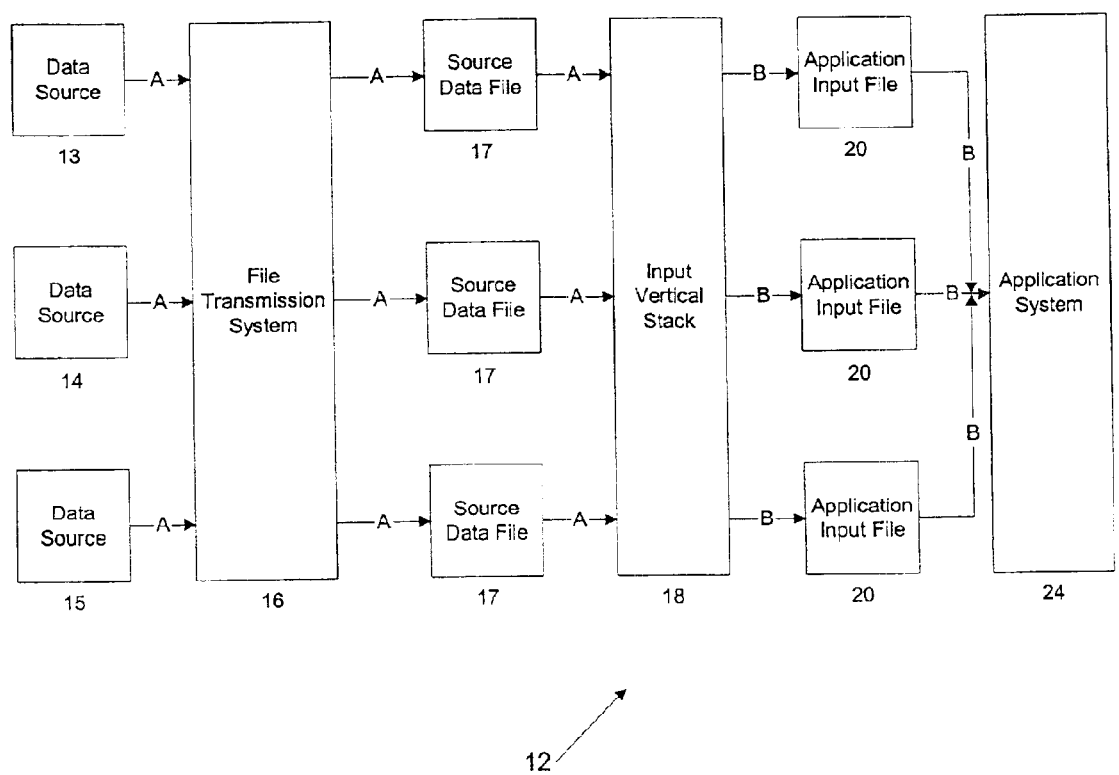
FIG. 1 is a block diagram illustrating the process flow for providing vertical stack processing by a data processing service provider of data provided by a plurality of sources of data, according to the present invention.

Referring to the drawings, FIG. 1 is a block diagram of a data processing system which provides vertical stack processing of data files in accordance with the present invention. FIG. 1 illustrates the flow of data from a plurality of data sources to an application system. As will be shown, the vertical stack processing involves the use of versioned sets of data file records. This allows individual records to be changed both horizontally by using reserved unused space for adding or expanding fields and/or vertically by adding new records to record sets, so that the amount of data associated with a given file record can be increased without requiring all existing users having to make synchronized changes. A given data file can include any number of record types, any number of sets and versions of records within a record type and any number of levels for records in the data file. As will be shown, each record type has its own unique version number. Different record types can have different version numbers. However, a data file as a whole does not have a version. The maximum length of the data file records can be specified such that it is within the limitations of the transmission protocols expected to be used.

With reference to FIG. 1, in one embodiment, a plurality of sources of data 13, 14 and 15 are coupled to a data processing service provider, indicated generally by the reference numeral 12, by a file transmission system 16. While only three sources of data 13–15 are illustrated in FIG. 1, the data processing service provider typically receives data from hundreds of data sources.

Each data source, such as data source 13, creates client data files and transmits the client files to the data processing service provider for processing. The client data files, as transmitted by a data source 13–15, can be formatted in any version vertical stack format.

The file transmission system 16 receives client data files from the data sources 13–15 via data network facilities and stores the client data files in source data files 17 at the data processing service provider. In one embodiment, the data storage media for the source data files is disk storage. However, any suitable data storage media, such as magnetic tape, can be used. The source data files have the format of the corresponding client data files. The file transmission system 16 preferably includes a bidirectional communication channel, which can include dedicated telephone lines or any other suitable secure communication link, as is known in the art.

The data processing service provider 12 includes an input vertical stack processor 18 which processes the source data files 17 and creates application input files 20. The input vertical stack processor transforms the records of the source data files to current version records, and creates an application input file 20 for each source data file 17 received. The application input files 20 contain client data in the current version vertical stack format. The application input files 20 are routed to an application system or processor 24 which performs application functions such as editing, calculating, updating data bases, etc.

Figure 2:
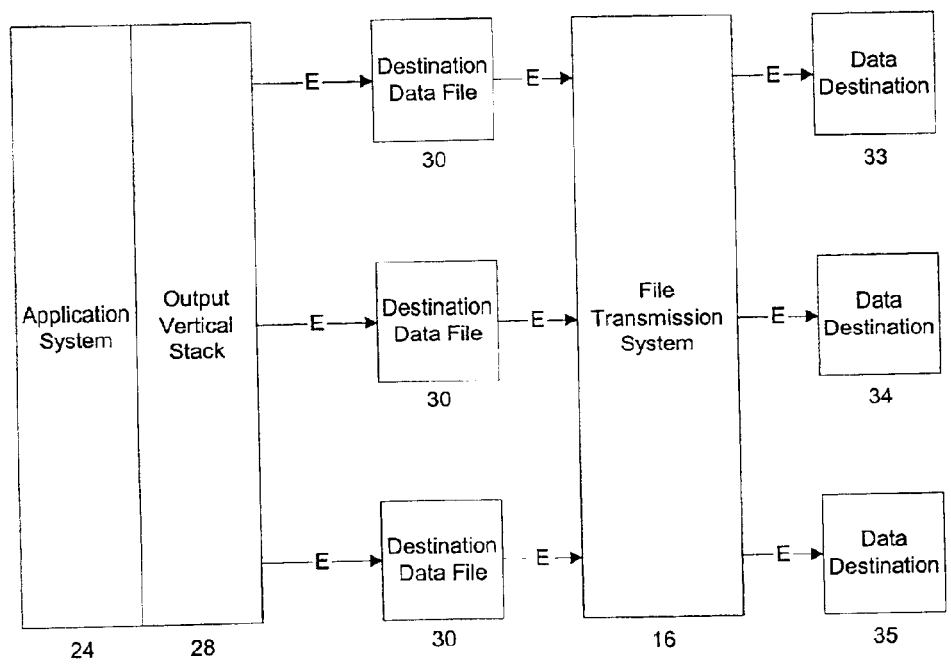
FIG. 2 is a block diagram illustrating the process flow for providing vertical stack processing of data provided by a data processing service provider for transmission to data destinations or targets, according to the present invention.

Referring also to FIG. 2, the application system 24 also creates data files for transmission to data destinations 33, 34 and 35. In one embodiment, these files contain current record versions which include all current and previous data fields for each record but are populated with data only in the current record version data fields.

FIG. 2 illustrates the flow of data from the application system 24 to a plurality of data destinations. The data processing service provider 12 includes an output vertical stack processor 28 which receives the current record versions created by the application system 24 and produces a destination data file 30. If no previous version data is required by the client targeted to receive the data file, the output vertical stack processor writes the current record versions to a destination data file 30. If previous version data is required, the output vertical stack processor 28 supplements the current record versions created by the application system 24 with previous version data. In one embodiment, the output vertical stack processor 28 supplements the data contained in the current record version, providing a record that includes current version data and data for at least one, and preferably all previous record versions. The destination data files 30 can be transmitted to the data destinations 33–35 via the file transmission system 16.

Each data destination, such as data destination 33, receives client output data files directed to that data destination. As stated above, in one embodiment, the client output data files can include data records which include data in the current version fields as well as in all previous version fields. In this embodiment, the data destination can transform the records of the output data file to the client's internal format. The data destinations 33, 34 and 35 can be the data sources 13, 14 and 15, for example.

For purposes of illustration, the present invention is described with reference to processing of monetary transactions, and in particular, to a system in which the data sources 13, 14 and 15 are financial institutions and the like, which transmit raw transaction data to the data processing service provider 12 for processing. For example, the data processing service provider 12 can provide debit/credit information to the financial institutions on a per account basis. Typically, hundreds of banks provide transaction information to be processed on a daily or weekly basis. The transaction data can, for example, include information relating to new accounts, closed accounts, and processed data such as deposit and loan transactions.

In some cases, transaction information relating to a customer account is produced exterior to the customer's bank or financial institution. For example, transactions completed by third party providers can include those conducted using automated teller machines, or checks processed by a clearing house.

The preferred embodiment of the present invention is described with reference to banks and their processing service provider. However, the present invention is applicable to both other industries and internal processing centers which have the need to receive and send files to customer, supplier, and other internal sites.

Criteria for Controlling Records

The following are criteria used in controlling records of the formatted files in accordance with the invention.

1. No proprietary data form can be used. The data format must be character data such as ASCII or EBCDIC. Data cannot be expressed in other specific formats, such as IBM proprietary format COMP-3 (packed data) and COMP (binary data), for example.

2. The size of a record cannot change. All records are the same physical size, regardless of the number of characters used in the record. The optimum size is based on the transmission capabilities expected to be used now and in the future. The size of the record is committed to by all parties. This is in contrast to prior art systems that merely expand the record size to accommodate changes in information being transmitted. In one embodiment, the record is two hundred bytes. If a record has to be larger, the record is split into two or more records.

3. A file can be formatted as multiple records with each record of a set of records being two hundred bytes in length.

4. The records are versioned. The fact that a record as been changed is indicated by changing the version number or that record.

5. Once data fields have been "published", the data fields cannot change. A data field cannot be changed in terms of format, location (record offset position) or definition.

Thus, the usage or the size or the attributes of a production field are never changed. All new characteristics, including new field sizes or attributes, are accomplished either by placing the changes into new versions of the existing record or by adding new records. If a change is going to be accomplished by changing an existing record in the set by shortening the reserved area and replacing it with new files, several steps are taken as will be described.

Input Vertical Stack Process

Figure 3:
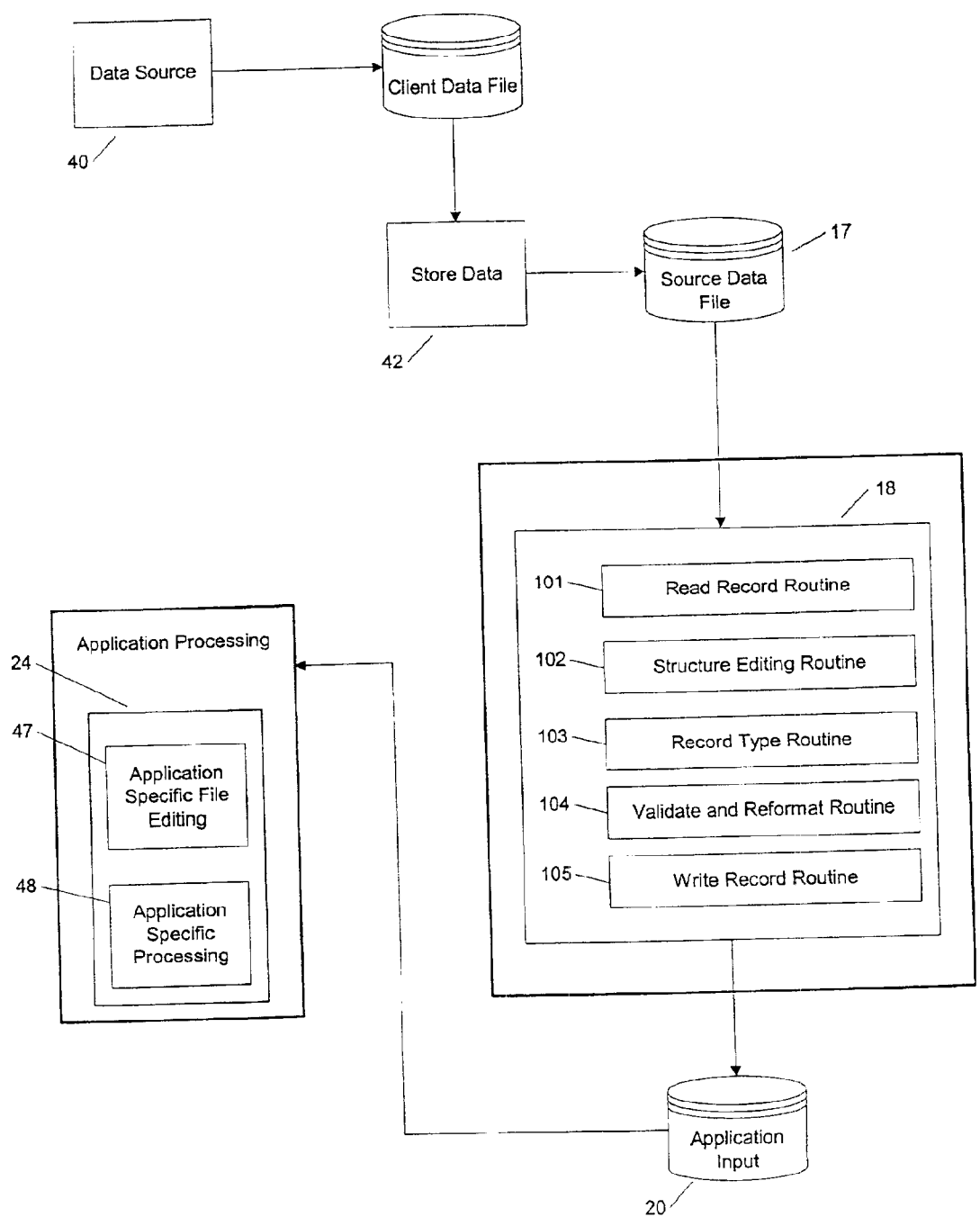
FIG. 3 is a block diagram of input vertical stack processing of inbound versioned records in accordance with the present invention.

FIG. 3 is a block diagram of the input vertical stack processing flow of versioned records in accordance with the present invention. In block 40, client processing creates a client data file and transmits the client data file to the data processing service provider. The client data file is a valid vertical stack file which can be formatted in any version vertical stack format.

The client data file is received by the data processing service provider and stored, block 42, as a source data file 17. The source data file 17 subsequently is validated and transitioned by the input vertical stack processor 18.

The input vertical stack processor 18 includes a plurality of modules or routines which validate and transition each source data file 17 and create an application input file 20 for use by the application system 24. In one embodiment, the vertical stack processor includes a Read Record Routine 101, a Structure Editing Routine 102, a Record Type Routine 103, Version Validation and Reformat Routines 104 and a Write Record Routine 105. The Read Record Routine 101 reads the records of a source data file to be processed and calls the Structure Editing Routine. The Structure Editing Routine 102 provides basic file structure specific editing and calls the Record Type Routine 103. The Record Type Routine 103 determines the record type for a record being processed and then calls the appropriate one of the Version Validation and Reformat Routines 104. The Version Validation and Reformat Routines 104 provide transitioning of previous record versions to current record versions to bring a previous file version up to the current file version for processing by the application system 24. The Version Validation and Reformat Routines create an application input record for use by the application system. The Write Record Routine 105 writes the application input record to an application input file.

The application input file 20 is routed to the application system 24. The application system 24 provides application specific file editing 47 and application specific processing 48 of the application input file 20.

It is pointed out that although the vertical stack process according to the present invention is described with reference to receiving and transitioning inbound source data files, the process and techniques of the present invention are applicable to transitioning and transmitting outbound data files to data destinations as will be described.

File Format

Figure 4:
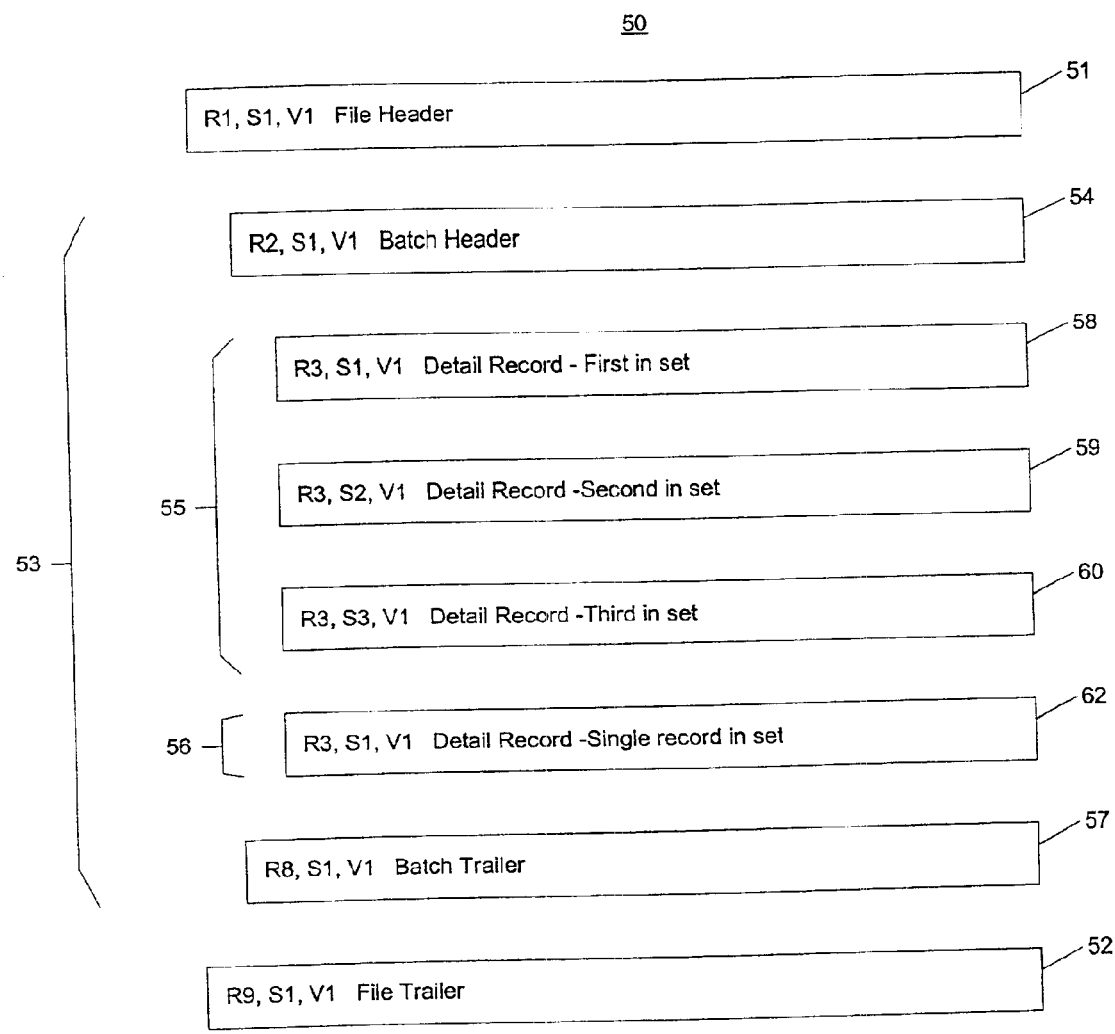
FIG. 4 illustrates the format of a transaction file including a plurality of sets of records in accordance with the present invention and which includes multiple records in one of the sets of records.

In one embodiment, each source data file 17, has the format of the data file 50 shown in FIG. 4. The data file 50 includes a file header record 51, a file trailer record 52, and one or more batches 53, each including a batch header record 54 one or more transaction sets 55 and 56 and a batch trailer record 57. Each transaction set can include one or more detail records, such as detail records 58, 59 and 60 which comprise three records in one transaction record set 55 and detail record 62 which is a single record in transaction set 56. Other embodiments may have fewer or more levels than the five listed above.

In one embodiment, the file header record 51 can include a record identifier R1, a record set identifier S1, version number V1, and data such as a destination-type identifier, a destination identifier, contents, the transmission date, a "within date" identifier, a source-type identifier, a source identifier, a "work as of" date and a source control string.

The batch header record 54 can include a record identifier R2, a record set identifier S1, a version number V1, and data such as owner-type identifier, owner identifier and a "work as of" date.

Each detail record, such as detail record 58, can include a record identifier R3, a set number S1, a version number V1, and one or more data containing fields.

The batch trailer 57 can include a record identifier R8, a record set identifier S1, the version number V1 and one or more data fields containing data such as a transaction count, credit dollars and debit dollars.

The file trailer 52 can include a record identifier R9, a record set identifier S1, the version number V1, and one or more data containing fields.

TABLE I

| Identifier | Value | Record Type |
| --- | --- | --- |
| R1 | 01 | File Header |
| R2 | 02 | Batch Header |
| R3 | 03 | Detail Record |
| R4–R7 | 04–07 | Unused |
| R8 | 08 | Batch Trailer |
| R9 | 09 | File Trailer |

The record types contained in data file 50 are identified in accordance with the following conventions listed in Table I. In one embodiment, the record type identifier for each record is contained in the first field for that record.

Thus, the file header is identified by a two digit record type or reference "01", where the numeral "01" indicates that this is a file header. Also, version number (and the set identifier) are indicated by a two digit reference, such as "01", which stands for version 1 of the record (and the record set number). In the example, detail records includes more than one record in a set. The set identifier, such as "S1", for a set of detail records for a given batch is a two digit reference, such as "01", which stands for the firs detail record in a set of detail records. The value "03" indicates that the record is a detail record of a file. The unused identifiers R4–R7 are provided to allow expansion in the types of detail records, for example, that can be included in a file.

In the exemplary file structure illustrated in FIG. 4, the file header and batch headers are identified as R1,S1,V1 and R2,S1,V1, respectively. The file trailer and batch trailers are identified as R9,S1,V1 and R8,S1,V1, respectively. The record set 55 includes multiple records, such as detail records R3,S1,V1; R3,S2,V1 and R3,S3,V1.

The content of the data file 50 is provided by way of illustration only. Although the data file 50 illustrated is shown as including a file header and trailer, a batch header and trailer and one or more detail records, in some instances, a file can include only a file header and file trailer. Also, the sequence of the records in data files can be different from that for data file 50. However, the same given sequence for records is used for all data files to be processed by the input vertical stack processor 18. Furthermore, the number of record types, sets, and versions may be defined to accommodate any number expected to be required.

A new record can be defined as part of this set after the initial release and done so as to affect only those who desire to use the new record features.

The record identifiers described above are used during processing of incoming data files to test for validity of file data that is being received. For example, it is expected that the first record of an incoming data file will be a file header. Thus, for example, if a file trailer not preceded by a, file header is received, it is assumed that the incoming data contains errors, and the processing of that data is aborted.

The following set of definitions are the logical flow patterns that are set after processing a given record in accordance with one embodiment of the invention. Each position corresponds to a record identifier on the inbound file. In the initial setting of "YNNNNNNNN", the "Y" is in the first position and indicates that the only allowed record on the initial read is a record identifier "01" for a file header. When the file header is processed, a pattern allowing a file trailer (i.e., "09") and a batch header (i.e., "02") is set. For example, the new setting to "NYNNNNNNY" where the second and ninth positions have been set to "Y", indicating that the batch header and the file trailer are allowed after the file header. The next pattern(s) is "NNYNNNNYN", corresponding to a detail record (i.e., "03") or to a batch trailer (i.e., "08"). The logical flow occurs nine times (once for each of the nine identifier values R1–R9), indexed by a logical flow index.

A further principle is related to what errors can be tolerated via default information. What is an error that will render the transaction as an error and treated as such downstream from this program and what is a fatal error and must terminate the file processing.

Data File Content

Referring to FIG. 5, there is shown the contents or layout of a data file 70 having a layout similar to the layout of data file 50 illustrated in FIG. 4.

The data file 70 includes a file header record 71, record type 01, as indicated by reference number 81, a batch header record 72 (record type 02), three detail records 73, 74, and 75 (record types 03), a batch trailer record 76 (record type 08) and a file trailer record 77 (record type 09).

Each of the records has a version number, such as version number "01", indicated by reference number 82, for the file header record 71. In the exemplary file 70, all of the records are version 01 records.

Each record further includes a set identifier, such as set identifier "01", indicated by reference number 83, for the file header record 71.

In addition, the file header record 71 includes file header data 84 and file header record free space 85.

The batch header record 72 includes batch header data 86 and batch header record free space 87.

The detail record 73 includes fields A, B, C, D, E and F and detail 01 record free space 88. The detail record 74, includes fields K, L, M and N and detail 02 record free space 89.

The detail record 75 includes fields S and T and detail 03 record free space 90.

The batch trailer record 76 includes batch trailer data 91 and batch trailer record free space 92.

The file trailer record 77 includes file trailer data 93 and file trailer record free space 94.

Referring now to FIG. 6, there is shown the contents of a data file 70', which corresponds to data file 70 after three of the records of data file 70 have been modified. By way of example, detail record 73 has been modified to add a field, detail record 74 has been modified to expand an existing field, and detail record 75 has been modified to add a record. The file header 71, the batch header 72, the batch trailer 76 and the file trailer 77 are unchanged, and thus correspond to like numbered records of data file 70 (FIG. 4).

By way of example, in data file 70', detail records 73 and 74' are modified versions of detail records 73 and 74, respectfully. Detail record 78 has been added to the record set. Detail 01 record 73', identified as being version 02 of detail 01 record 73, includes fields A', B', C', D', E', F' and G' and detail 01 record free space 95. Field G has been added to version 01 of detail 01 record 73 to create detail 01 record 73' and renumbered as record version "02". The prime notation has been applied to fields A–G in detail record 73' (as well as to fields in detail record 74') to differentiate the fields of detail record 73'(current version) from those of detail record 73 (previous version) for purposes of description. However, as is stated above, the fields of a record once published do not change and so fields A'–F' are the same as fields A–F.

Detail 02 record 74' (version 02), includes fields K', L', M' and N' and 0' and detail 02 record free space 96. Field O represents an expanded field corresponding to field L, i.e., field L-expanded, of version 01 of detail 02 record.

Detail 04 record 78 includes newly added field Y' and detail 04 record free space 97. Detail 04 record 78 has been added because the free space 94 in detail 03 record 75 was of insufficient size to accommodate the newly added field Y.

All vertical stack records have a defined maximum length which is not changed. As indicated above, detail records 73' and 74' illustrate how fields can be added to existing detail records 73 and 74, for example. If a record has insufficient free space to support an added or expanded field, a new record can be created, as represented by record 78, which has been added to the detail 03 record set that includes detail record 75.

Thus, each record includes N bytes or characters, and, for example N can be equal to two hundred. Generally, only some of the bytes are used, the remaining bytes are maintained as spare or reserve fields to allow additional features and/or data to be added to the record at a later date. If a record is modified, the version number is changed. For example, the version number for detail 01 record 73 is "01" whereas, the version number for detail 01 record 73' is "02". Similarly, the version number for detail 02 record 74 is "01", whereas the version number for detail 02 record 74' is "02". Detail 04 record 78 has been given the version number "01".

As can be seen by comparing data file 70, illustrated in FIG. 5, with data file 70', illustrated in FIG. 6, the two data files differ with respect to detail records 73, 74, 75. Data file 70' illustrated in FIG. 6 has the most "current" format. Generally, modifications or upgrades are made in the input file processors of the clients to ensure that data is located in the proper fields. However, in accordance with the invention, clients who, for any reason, chose not to upgrade, can continue to use the old, or obsolete format, i.e., data file 70. As will be shown, the input vertical stack processor 18 (FIG. 1) of the present invention determines which version of each record of each input file that is received, and when it is determined that one or more records of a received source data file are obsoleted versions, the source data file is transitioned or converted to the most current version, the data being transferred to the modified fields, prior to routing the data file to the application system 24 (FIG. 1).

Thus, a source data file having an obsolete format, such as that of file 70, would be transitioned to the most current format, the format of file 70' in the example.

Record Definition Map

The file identification field identifies a record definition map for identifying which fields within the record are to be retrieved. The computer programs provide the user with a library of record identification maps. Each record identification map, sometimes referred to as a copybook, is a map for its respective record that provides a template from which fields in the record can be selected. Each record definition map provides information about each field within its record including the format, length and offset of the fields. Tables II–VIII are record definitions for the original version of records 71–77 of file 70 illustrated in FIG. 5. A separate record definition map is provided for each record of a file and for each version of each record of the file.

Original Version Record Definitions

TABLE II

File Header (01) Record Definition - Set ID 01

| FIELD NAME | LENGTH | TYPE | DEFAULT VALUE |
|---|---|---|---|
| Record ID | 2 | Character Numeric | 01 |
| Set ID Number | 2 | Character Numeric | 01 |
| Version Number | 2 | Character Numeric | 01 |
| File Header Data | 70 | Character | Spaces |
| File Header Free Space | 124 | Character | Spaces |

TABLE III

Batch Header (02) Record Definition - Set ID 01

| FIELD NAME | LENGTH | TYPE | DEFAULT VALUE |
|---|---|---|---|
| Record ID | 2 | Character Numeric | 02 |
| Set ID Number | 2 | Character Numeric | 01 |
| Version Number | 2 | Character Numeric | 01 |
| Batch Header Data | 96 | Character | Spaces |
| Batch Header Free Space | 98 | Character | Spaces |

TABLE IV

Detail Record (03) Record Definition - Set ID 01

| FIELD NAME | LENGTH | TYPE | DEFAULT VALUE |
|---|---|---|---|
| Record ID | 2 | Character Numeric | 03 |
| Set ID Number | 2 | Character Numeric | 01 |
| Version Number | 2 | Character Numeric | 01 |
| Field A | 5 | Character | Spaces |
| Field B | 15 | Character | Spaces |
| Field C | 10 | Character Numeric | Zero |
| Field D | 40 | Character | Spaces |
| Field E | 50 | Character | Spaces |

TABLE IV-continued

Detail Record (03) Record Definition - Set ID 01

| FIELD NAME | LENGTH | TYPE | DEFAULT VALUE |
|---|---|---|---|
| Field F | 15 | Character Numeric | 100 (rt. Justify) |
| Detail Record - Set ID 01 - Free Space | 59 | Character | Spaces |

TABLE V

Detail Record (03) Record Definition - Set ID 02

| FIELD NAME | LENGTH | TYPE | DEFAULT VALUE |
|---|---|---|---|
| Record ID | 2 | Character Numeric | 03 |
| Set ID Number | 2 | Character Numeric | 02 |
| Version Number | 2 | Character Numeric | 01 |
| Field K | 65 | Character | Spaces |
| Field L | 18 | Character Numeric | Zero |
| Field M | 15 | Character Numeric | Zero |
| Field N | 25 | Character | Spaces |
| Detail Record - Set ID 02 - Free Space | 71 | Character | Spaces |

TABLE VI

Detail Record (03) Record Definition - Set ID 03

| FIELD NAME | LENGTH | TYPE | DEFAULT VALUE |
|---|---|---|---|
| Record ID | 2 | Character Numeric | 03 |
| Set ID Number | 2 | Character Numeric | 03 |
| Version Number | 2 | Character Numeric | 01 |
| Field S | 65 | Character | Spaces |
| Field T | 100 | Character | Spaces |
| Detail Record - Set ID 03 - Free Space | 29 | Character | Spaces |

TABLE VII

Detail Record Definition - Set ID 01

| FIELD NAME | LENGTH | TYPE | DEFAULT VALUE |
|---|---|---|---|
| Record ID | 2 | Character Numeric | 08 |
| Set ID Number | 2 | Character Numeric | 01 |
| Version Number | 2 | Character Numeric | 01 |
| Batch Trailer Data | 120 | Character | Spaces |
| Batch Trailer Free Space | 74 | Character | Spaces |

TABLE VIII

File Trailer Record Definition - Set ID 01

| FIELD NAME | LENGTH | TYPE | DEFAULT VALUE |
|---|---|---|---|
| Record ID | 2 | Character Numeric | 09 |
| Set ID Number | 2 | Character Numeric | 01 |
| Version Number | 2 | Character Numeric | 01 |
| File Trailer Data | 151 | Character | Spaces |
| File Trailer Free Space | 43 | Character | Spaces |

In one embodiment, each Table, such as Table IV for the detail 01 record 73, includes four columns. The first column includes the field name. The second column includes the length (in bytes) of each field. The third column includes the data type for each field. The fourth column includes the default values for each field. For each record definition map, the first three rows list parameters of the record ID (two bytes), the set ID number (two bytes) and the version number (two bytes), respectively. The fourth row through the second last row include data. The last row lists parameters of free space for the record. For detail 01 record (Table IV), data fields A–F require 135 bytes. Accordingly, this record uses 141 bytes and has fifty-nine bytes in reserve.

The default values for fields A, B, D and E are "spaces". These fields can be blanks. The default value for field C is zero. This field can be 0. The default value for field F is 100, justified right.

Similarly, the second column for the other records 71, 72, 74, 75, 76 and 77 of the file indicates the length of each data field and the length of the reserve or free space for the record.

It is pointed out the layout and content of the record definitions as provided in Tables II–VIII is by way of example only and other layouts, values, etc. can be used depending upon specific applications.

New Version Record Definitions

TABLE IX

Detail Record (03) Record Definition - Set ID 01 - Version 02

| FIELD NAME | LENGTH | TYPE | DEFAULT VALUE |
|---|---|---|---|
| Record ID | 2 | Character Numeric | 03 |
| Set ID Number | 2 | Character Numeric | 01 |
| Version Number | 2 | Character Numeric | 02 |
| Field A' | 5 | Character | Spaces |
| Field B' | 15 | Character | Spaces |
| Field C' | 10 | Character Numeric | Zero |
| Field D' | 40 | Character | Spaces |
| Field E' | 50 | Character | Spaces |
| Field F' | 15 | Character Numeric | 100 (rt. Justify) |
| Field G' | 10 | Character Numeric | 999999999 |
| Detail Record - Set ID 01 - Free Space | 49 | Character | Spaces |

TABLE X

Detail Record (03) Record Definition - Set ID 02 - Version 02

| FIELD NAME | LENGTH | TYPE | DEFAULT VALUE |
|---|---|---|---|
| Record ID | 2 | Character Numeric | 03 |
| Set ID Number | 2 | Character Numeric | 02 |
| Version Number | 12 | Character Numeric | 02 |
| Field K' | 65 | Character | Spaces |
| Field L' | 18 | Character Numeric | Zero |
| Field M' | 15 | Character Numeric | Zero |
| Field N' | 25 | Character | Spaces |
| Field O' (Expanded Field L) | 32 | Character Numeric | Zero |
| Detail Record - Set ID 02 - Free Space | 39 | Character | Spaces |

TABLE XI

Detail Record (03) Record Definition - Set ID 03 - Version 01

| FIELD NAME | LENGTH | TYPE | DEFAULT VALUE |
|---|---|---|---|
| Record ID | 2 | Character Numeric | 03 |
| Set ID Number | 2 | Character Numeric | 03 |
| Version Number | 2 | Character Numeric | 01 |
| Field S | 65 | Character | Spaces |
| Field T | 100 | Character | Spaces |
| Detail Record - Set ID 03 - Free Space | 29 | Character | Spaces |

TABLE XII

Detail Record (03) Record Definition - Set ID 04 - Version 01

| FIELD NAME | LENGTH | TYPE | DEFAULT VALUE |
|---|---|---|---|
| Record ID | 2 | Character Numeric | 03 |
| Set ID Number | 2 | Character Numeric | 04 |
| Version Number | 2 | Character Numeric | 01 |
| Field Y' | 150 | Character | Spaces |
| Detail Record - Set ID 03 - Free Space | 44 | Character | Spaces |

In the example, detail records 73, 74 and 75 of the data file 70 illustrated in FIG. 5 have been changed. The new data file 70' including the modified records is illustrated in FIG. 6. As part of a change in a record, a new record definition map is created for the new version of that record. The record definition map for the new version of the record includes the new version number. Moreover, each record definition map has the version number embedded in the name for that map.

Tables IX, X, and XII are record definitions for detail records 73' 74' and 78, which are the new versions of the detail records 73 and 74, and the record added as a "supplement" to record 75 of the file 70 (FIG. 5). The new versions of detail records 73' and 74' and record 78 are illustrated in FIG. 6. The layout of the record definitions is similar to that for detail records 73 and 74 as described above and the differences between the original version, version "01" and the new version, version "02" (for records 73' and 74') can be seen by comparing the information contained in Tables IV and V with the information contained in Tables IX, and X, respectively.

More specifically, with reference to Tables IX and IV, in the current version of the detail 01 record (Table IX), where a ten byte field G', has been added, the length of the reserve area has been decreased from fifty-nine bytes to forty-nine bytes.

Similarly, with reference to Tables X and V, for the current version of detail 02 record (Table X), where a new thirty-two byte field "O" has been added in order to expand field L from eighteen bytes to thirty-two bytes, the length of the reserve area has been decreased from seventy-one bytes to thirty-nine bytes. Field L remains in the file.

The information contained in Table XI for detail 03 record set ID 03 (detail record 75) is the same as the information contained in Table V1. Table XII is the record definition for the detail 03 record set ID 04 (detail record 78) that has been added to the set of detail records.

The record definitions provided in Tables II–XII are stored in memory as static memory area maps for use in processing records of source data files. FIG. 7 is a simplified representation of a portion of a memory 298 containing static memory area maps 300–304 for the file header record 71, detail record 73, detail record 73', detail record 74 and detail record 74', respectively. The static memory area maps include record, set and version fields for each record, and indicate the size of the fields of the record. Moreover, the static memory area maps include default values for each data field. Comparing static memory area maps 301 and 302, for example, the fields of the current version (area map 302) have been given a prime notation, to identify these fields A'–G' as fields of an updated version (i.e., records 73') of the record 73. A similar notation is used for fields of detail record 74 and its current version 74'.

The memory 298 further includes work area maps 310–314 corresponding to static memory area maps 300–304, respectively, which are used in transitioning records as will be shown. The work area maps include record, set and version fields and indicate the size of the fields of the record. However, the work area maps do not include default values. The memory 298 further includes an input buffer area 320 for receiving input records read from a source data file being processed, and an output buffer area 321 for temporarily storing transitioned records prior to the records being written to an output file, such as an application input file 20 (FIG. 1).

Both the static memory area maps and the work area maps are updated, adding new records and/or new record versions, whenever a new record or a new version of a record is created.

Moreover, in the software program, the particular routine that handles the particular record set in which one or more records is changed is altered so that it's evaluation of the version number of an inbound record ensures that the correct routine is performed. In addition, a new routine for the obsoleted version identifier is created.

Creating Modified Records

As is stated above, the data processing service provider implements changes in the formats of client data files. The need for a change in file format can originate either with the data processing service provider or with one or more of its clients.

The changes are done manually by personnel of the data processing provider. To add a new field to an existing record of a record set, for example, the new field is created using the necessary number of bytes of the reserve area. If the size of the new field is greater than the reserve area, a new record is created for the record set. Similarly, if an existing field of an existing record is to be expanded, a new field is created using the necessary number of bytes of the reserve area. If the size of the new field is greater than the reserve area, a new record is created for the record set.

Also, a new version of a record definition is created for the modified or new record. The record definition is given the new version number. In addition, a transitioning subroutine is created.

Process Flow Diagrams

Figure 8:
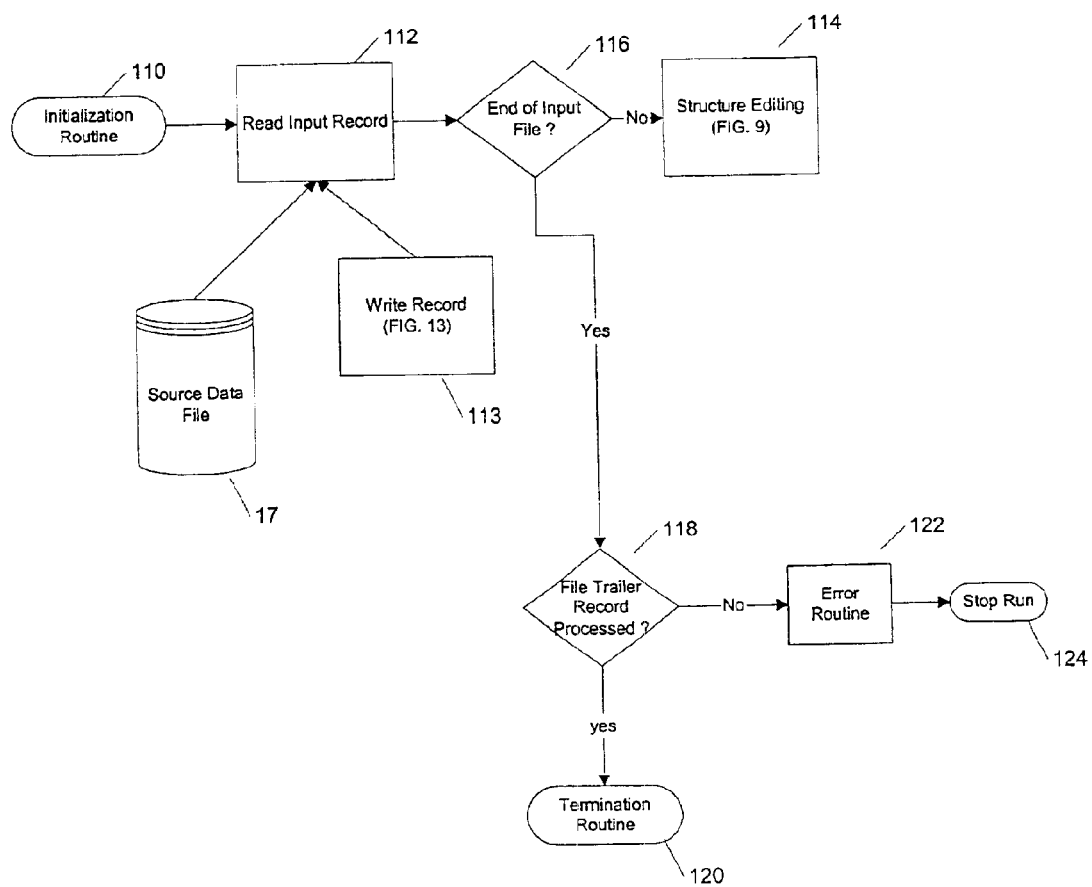
FIG. 8 is a process flow diagram for a Read Record Routine of an input vertical stack process provided by the present invention.
Figure 9:
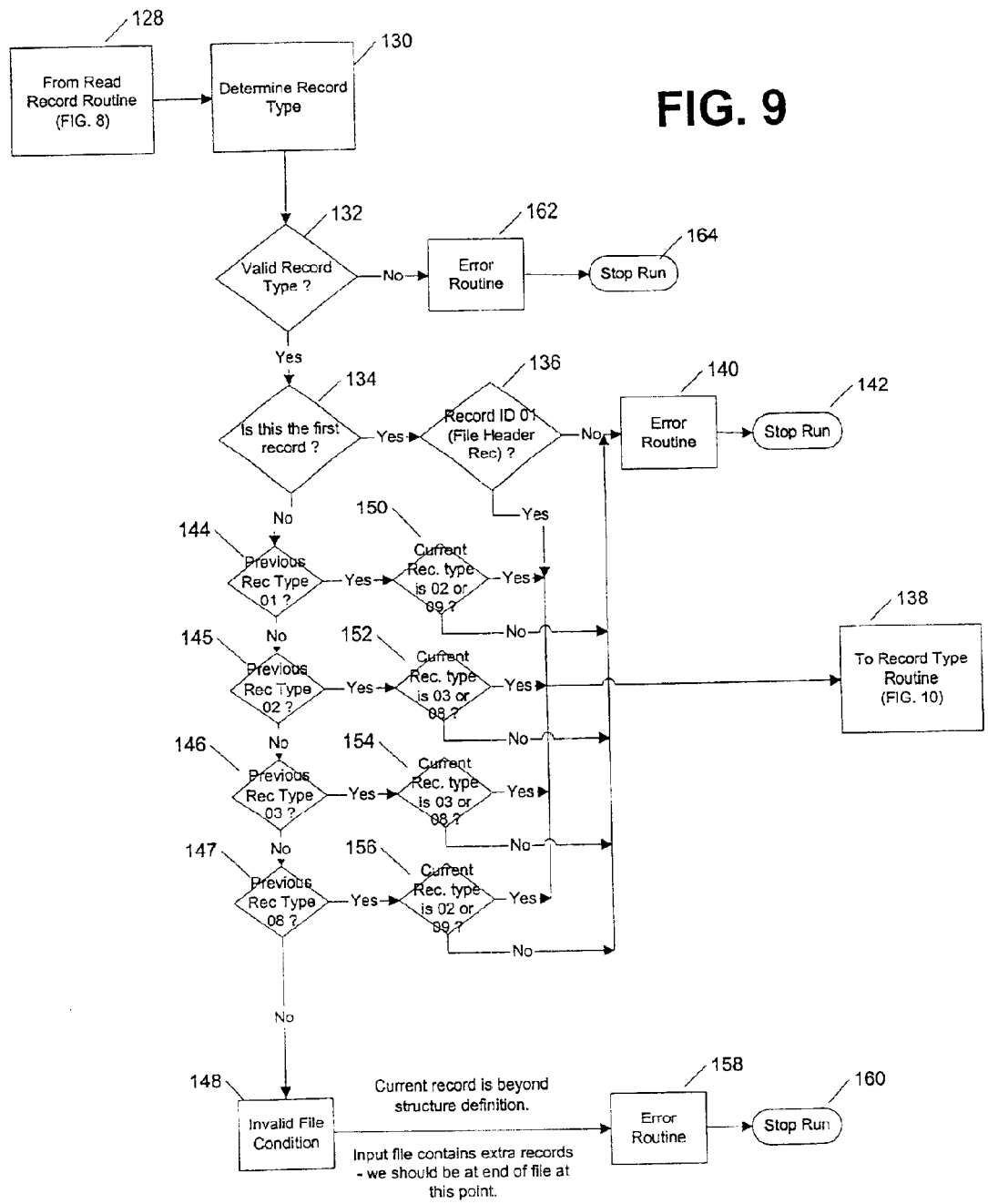
FIG. 9 is a process flow diagram for a Structure Editing Routine of the input vertical stack process provided by the present invention.
Figure 10:
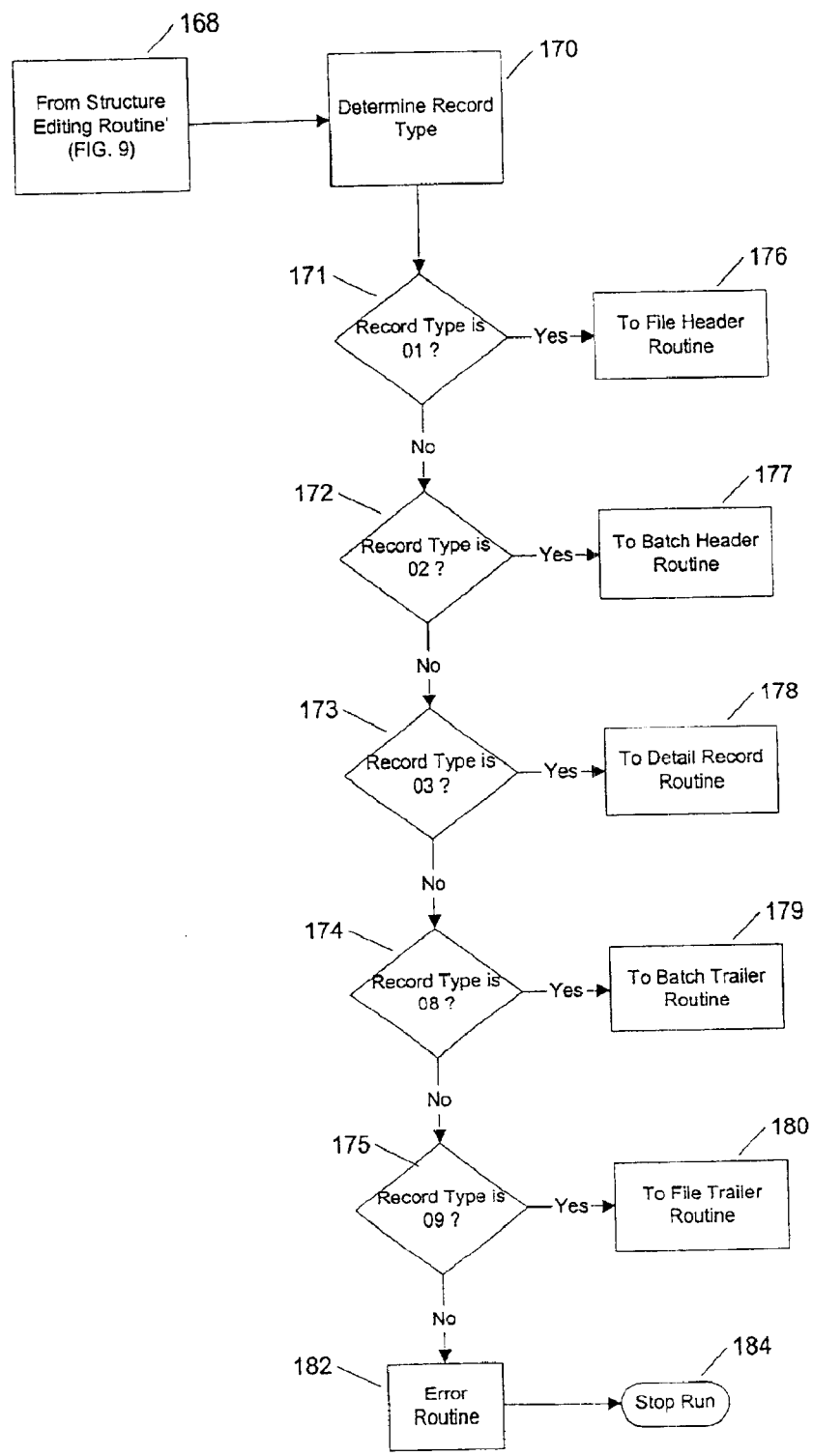
FIG. 10 is a process flow diagram for a Record Type Routine of the input vertical stack process provided by the present invention.
Figure 11:
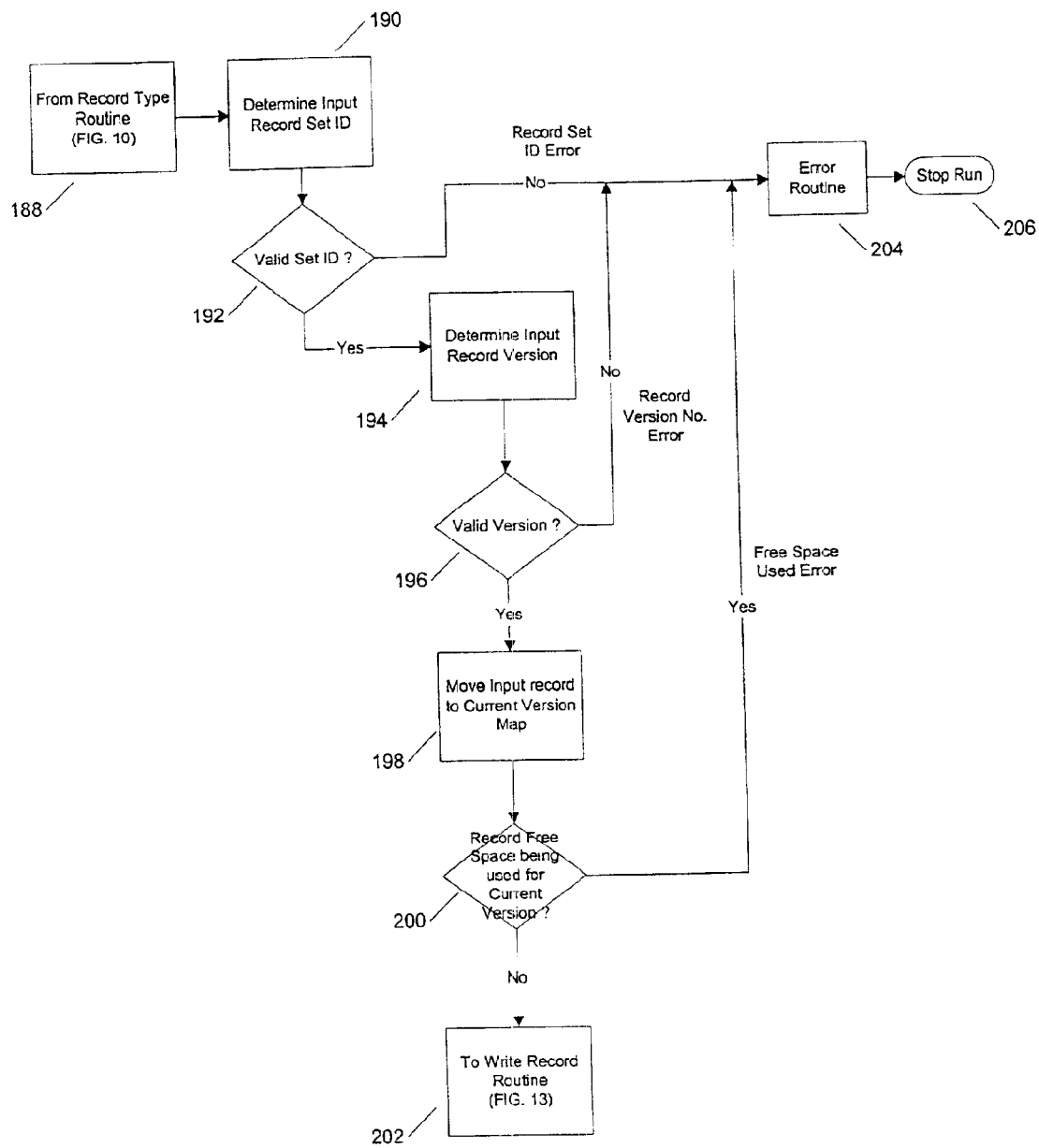
FIG. 11 is a process flow diagram for a File Header Routine of the input vertical stack process provided by the present invention.
Figure 12:
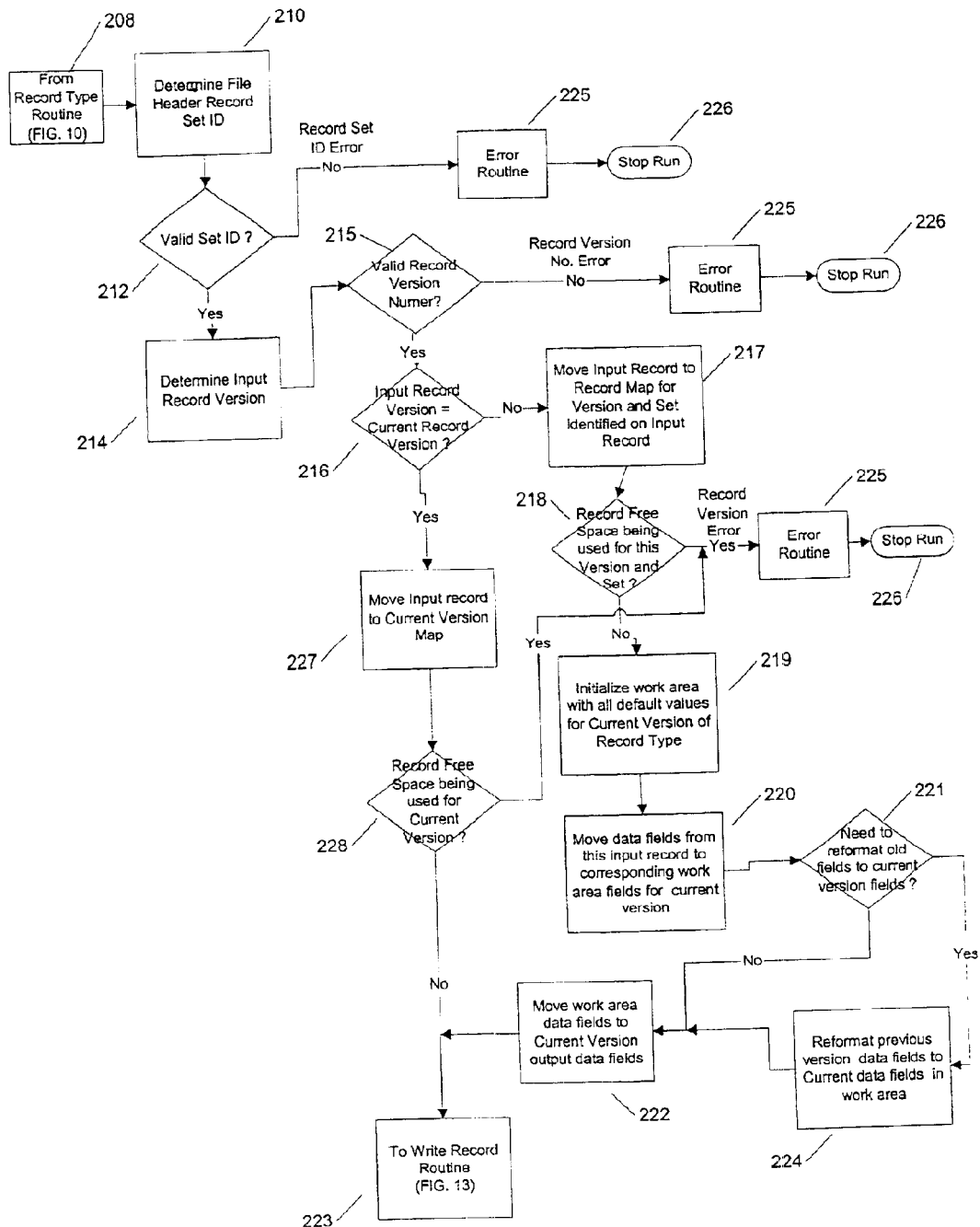
FIG. 12 is a process flow diagram for a Detail Record Routine of the input vertical stack process provided by the present invention.
Figure 13:
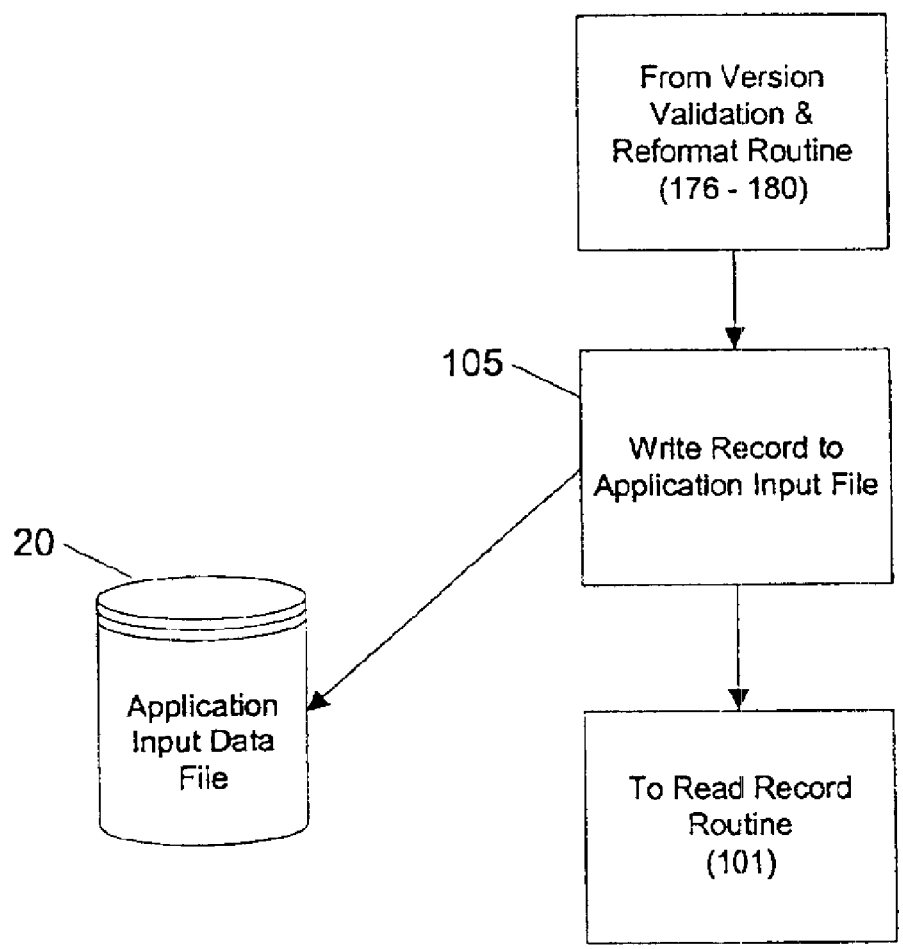
FIG. 13 is a process flow diagram for a Write Record Routine for application input files in accordance with the present invention.

As is illustrated in FIG. 3, the input vertical stack process includes a Read Record Routine 101, shown in detail in FIG. 8, a Structure Editing Routine 102, shown in detail in FIG. 9, a Record Type Routine 103, shown in detail in FIG. 10, Version Validation and Reformat Routines 104, such as File Header Routine 176 and Detail Record Routine 178, shown in detail in FIGS. 11 and 12, respectively, and a Write Record Routine 105, shown in detail in FIG. 13.

Briefly, the Read Record Routine 101 reads each source data file that is received from one of the data sources 13–and calls the Structure Editing Routine 102. The Structure Editing Routine 102 provides file structure specific editing to ensure that each of the records of the source data file meets the logical flow patterns as described above. If any one of the records is received out of the prescribed order, processing of the input file is stopped.

For validated records, the Record Type Routine 103 determines the record type and calls the appropriate one of the Version Validation and Reformat Routines 104, such as the Detail Record Routine 178 shown in detail in FIG. 12, which transitions previous file versions to current versions and creates an application input file. Each of the record types has its own transitioning logic. As will be described, the transitioning routines provide version specific default values for the current file version. The transitioning routines determine if any records of the source data file being processed are not the most current version and, if so, transitions that record to the most current version. The transitioning routines also remove version specific information after transition of a previous version to the current version. The Write File Routine 105 writes the current version records to the application input file.

Read Record Routine

More specifically, with reference to FIG. 8, the Read File Routine 101 starts at block 110 which is an initialization routine. In one embodiment, the initialization routine opens input and output files and performs other initialization processing. By way of illustrating the input vertical stack processing in accordance with the invention, the following description makes reference to the file 70, shown in FIG. 5, in which some of the records 73 and 74 are previous versions, and to the file 70', shown in FIG. 6, in which some of the records 73', 74', 75 and 78 are current versions.

When initialization is completed, the records are read from the source data file 17, block 112. In response to reading the first record in the source data file, the Structure Editing Routine is called, block 114, to provide structure editing of the first record, the file header record 71. The other records, such as records 72–77, etc., of the source data file are read, sequentially, in response to the Write Record Routine, block 113, providing an indication that processing of the previous record has been completed.

When all of the records of the source data file being processed have been read, as determined by decision block 116, flow proceeds to decision block 118, and when the file trailer record 77 has been processed, processing is ended, block 120. However, if decision block 118 indicates that the file trailer record 77 has not been processed, there is an error in the source data file being processed, and an error routine is run, block 122, and the run is stopped, block 124.

Structure Editing Routine

Referring now to FIG. 9, the Structure Editing Routine 102 is called by the Read Record Routine, block 128. At block 130, the record type is determined. In one embodiment, the record must include a record identifier that is 01, 02, 03, 08 or 09. Other embodiments would include the record types defined by the system. In the present example, the record identifier for the file header is "01". When decision block 132 determines that the record identifier of the record being processed is "01", which is one of the values valid for the exemplary system, flow proceeds to decision block 134 which determines if this is the first record of the current source data file. If decision block 134 determines that this is the first record, flow proceeds to decision block 136. In the example, the first record of the source data file is the file header record. When decision block 136 determines that the record identifier is "01", the record identifier for the file header record, the Record Type Routine 103 is called, block 138, to select the appropriate record transitioning routine, the File Header Routine in this case, as will be described.

If decision block 136 determines that the record identifier is other than that for the file header record, this indicates that there is an error in the file, such as a record missing, or records out of order. If it is determined that an error exists in the file, an error routine is run, block 140, and the run is stopped, block 142.

After the file header record is processed, the current record type, "01" in the example, is stored in memory for use as a reference point in the processing (blocks 144–148) of further records of the current source data file.

If decision block 134 determines the current record is not the first record, flow proceeds to decision blocks 144–148 which determine the record type for the previously processed record. This record type for the previously processed record is determined by looking up the previous record type value stored in memory. According to the protocol established, the second record of a data file must be a batch header (type 02) or a file trailer (type 09). If the current record type is either record type "02" or record type "09", the Record Type Routine is called, block 138 to select the appropriate transitioning routine.

In the example, the next record that is processed is the batch header record type "02". Because the previous record is type "01", i.e., the file header record, flow proceeds to decision block 150 which determines that the current record type value is "02" or "09".

In subsequent passes, in processing the other records of the file 70 or 70', when decision block 145 determines that the previous record type is that for a batch header record type "02", decision block 152 causes the Record Type Routine (block 138) to be called if the current record type is either a detail record type "03" or batch trailer type "08".

Similarly, decision blocks 146 and 154 cause the Record Type Routine to be called when a detail record type "03" is followed by either another detail record type "03" or by a batch trailer record type "08". Decision blocks 147 and 156 cause the Record Type Routine to be called when a batch trailer record type "08" is followed by either a header record type "02" or a file trailer record type "09".

However, if the previous record was a file trailer record type "09" record, block 148, the current record is beyond structure definition. Accordingly, an error routine is called, block 158, and the run is stopped, block 160.

If decision block 132 determines that the record identifier of the record being processed is not a valid value, i.e., "01", "02", "03", "08" or "09", an error routine is run, block 162, and the run is stopped, block 164.

Decision blocks 150, 152, 154 and 156 all have a "no" branch to the error routine, block 140 and stop run, block 142.

Record Type Routine

Referring now to FIG. 10, the Record Type Routine 103 is called by the Structure Editing Routine, block 168. Block 170 determines the record type, and depending upon the record type, one of the decision blocks 171–175, calls the appropriate one of the Version Validation and Reformat Routines, such as the File Header Routine (block 176), the Batch Header Routine (block 177), the Detail Record Routine (block 178), the Batch Trailer Routine (block 179), or the File Trailer Routine (block 180), respectively.

In the example, the first record is the file header record type "01". Thus, decision block 171 causes the File Header Routine 176 to be run.

If the record being processed is not a file header record type "01", a batch header record type "02", a detail record type "03", a batch trailer record type "08", or a file trailer record type "09", then an error routine is run, block 182, and the run is stopped, block 184.

File Header Routine

Figure 14:
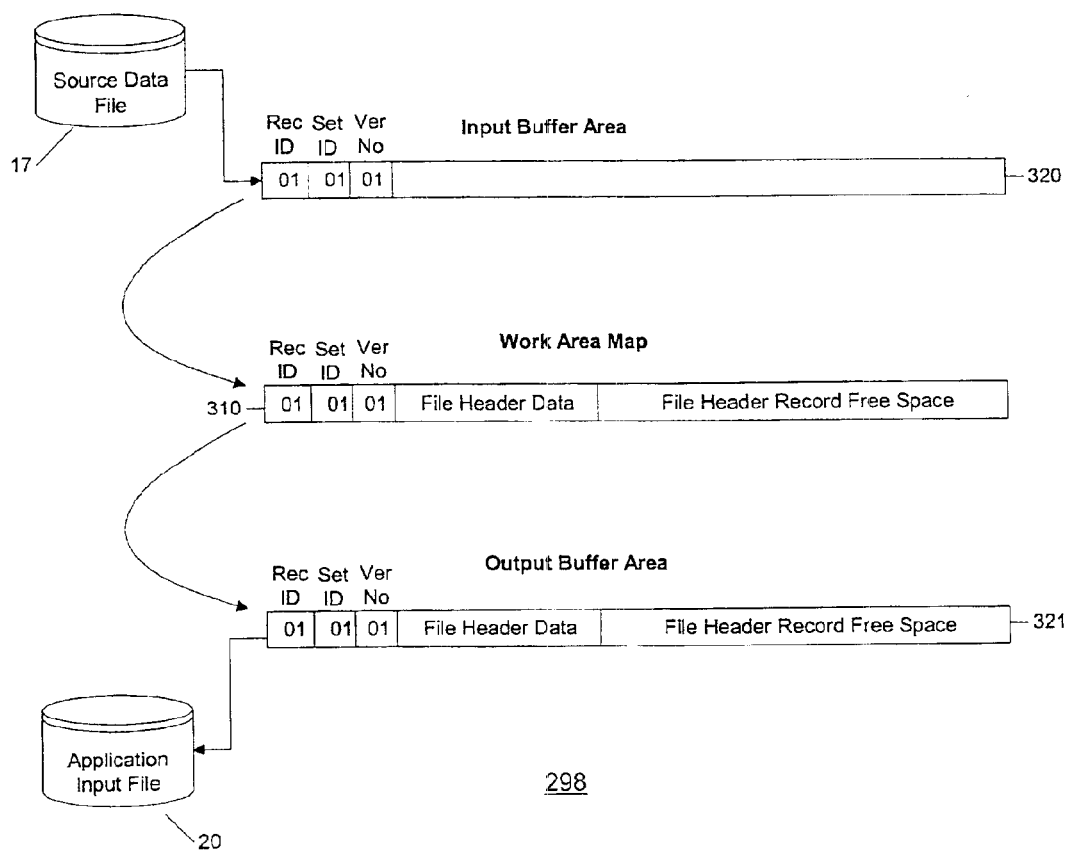
FIG. 14 illustrates work and buffer areas used to process a file header record by the File Header Routine of FIG. 11.

Referring to FIGS. 7 and 14, the static memory area map for record 71 is indicated by reference numeral 300 (FIG. 7). This is the only version of that record. Record 71, read from the source data file 17 by the Read Record Routine 101 (FIG. 10), is stored in the input buffer area 320 of memory 298 (FIG. 14).

Referring also to FIG. 11, the File Header Routine 176 is called by the Record Type Routine, block 188. In block 190, the record set identifier is determined which, for the file header record, is "01". Flow proceeds to decision block 192 which determines if the set identifier is a valid number. The value "01" is valid for a set identifier number, and so flow proceeds to block 194 which determines the version of the input record being processed.

Because there is only one version of the file header record 71, there is no need to determine if the input record is the current version, or to provide version processing as is required for processing versioned records, such as detail records 73 and 74, for example, as will be described with reference to FIG. 12, blocks 217–224. Accordingly, the processing routine for the file header is simpler than the processing routine for versioned records, such as detail records 73 and 74.

Block 196 determines if the input version number is a valid version number. If so, flow proceeds to decision block 198 which moves the input record to the most current version. In this step, the input record 71 stored in the input buffer area 320 is moved to the correct version map, work area 310, for the input record 71.

Decision block 200 (FIG. 11) determines if free space for the current version is being used by the input record. As is stated above, the work area 310 indicates the size of the fields and the length of the reserve area for the current version of the file header record 71. In the example, it is assumed that free space is not being used and so the record contained in the work area 310 is the most current record version of the file header record 71.

The record stored in work area 310 is in condition for use in processing. The record in work area 310 is transferred to the output buffer 321, and the Write Record Routine, writes the current version record to the application input file, block 202, for use by the application system 24 (FIG. 1).

If decision block 200 determines that free space for the current version is being used by the input record, an error routine is run, block 204, and the processing is stopped, block 206. It is possible that some of the free space of a record can be used inadvertently if the client who created the data file being processed loaded the data incorrectly.

The error routine 204 is run and the processing is stopped if decision block 192 determines the set identifier is an invalid number or if decision block 196 determines the version number is an invalid number.

Referring to FIG. 10, in the example, new versions have not been created for the batch header record, the batch trailer record or the file trailer record. Accordingly, the process flow for the Batch Header Routine (block 177), the Batch Trailer Routine (block 179) and the File Trailer Routine (block 180) is substantially the same as that for the File Header Routine 176 illustrated in FIG. 11, and accordingly, these routines are not described or illustrated.

Likewise, the other non-versioned records 72, 75, 78, 76 and 77 of the files 70 and 70' are processed by the Read Record Routine 101, the Structure Editing Routine 102, the Record Type Routine 103, the Version Validation and Reformat Routines 104 and the Write Record Routine 105, as described above for processing of the file header record.

Detail Record Routine

Figure 15:
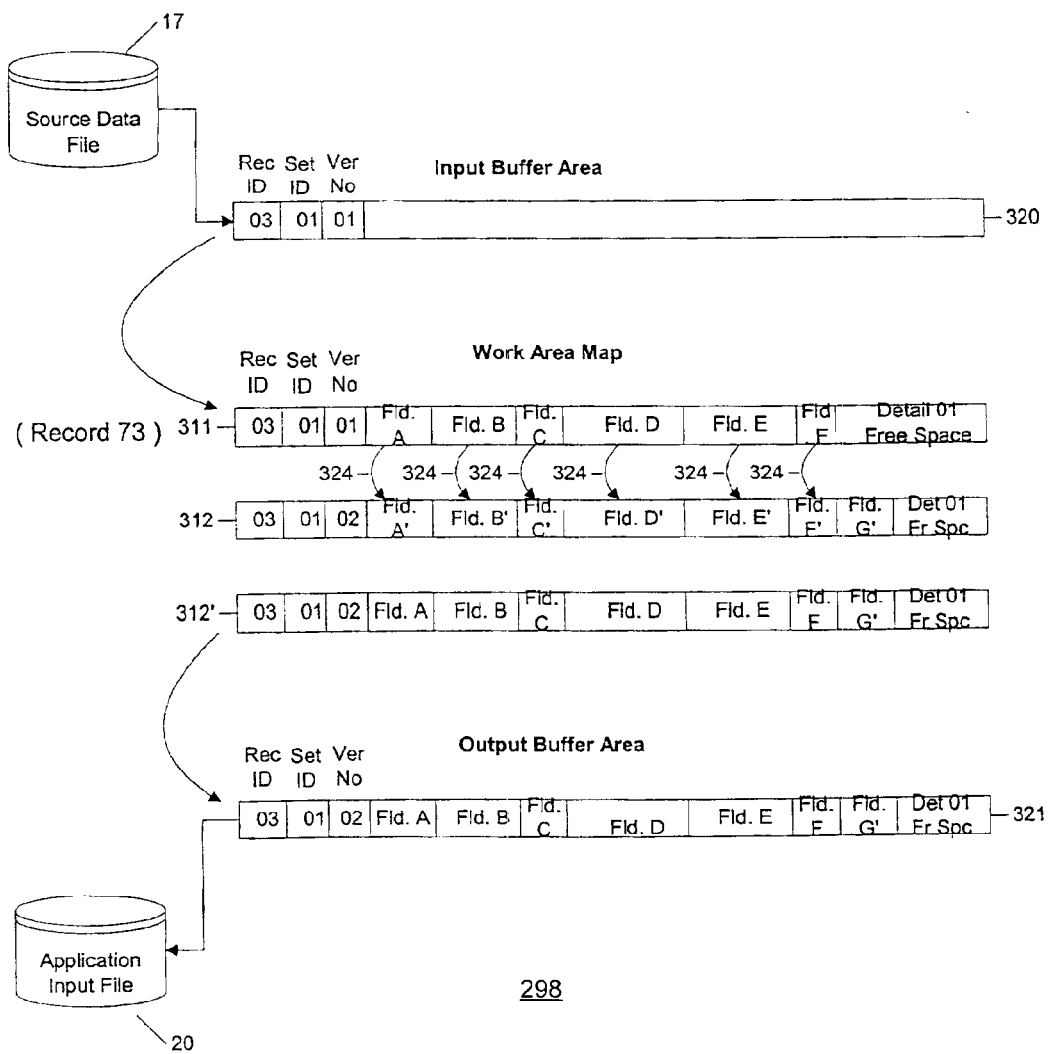
FIGS. 15 and 16 illustrate work and buffer areas used to process a detail record by the Detail Record Routine of FIG. 12.

Referring to FIGS. 7, 12 and 15, the following description illustrates the operation of the Version Validation and Reformat Routines 104 in processing records, such as detail records 73 and 74 for data file 70, which are not the current versions. Considering first the processing of detail record 73, which is identified as detail record type 03, record set ID 01, version 01, the Detail Record Routine 178 calls the Record Type Routine, block 208. The record set identifier and the validity of the record set identifier are determined, blocks 210 and 212, and the input record version (block 214), and validity of the version number (block 215), are determined in the manner described above in processing the file header record.

However, when the input record version is not the current version, as determined by block 216, record 73 must be transitioned into the current version, record 73', shown in FIG. 6. Each detail record is processed by an associated routine. The routine is altered so that its inbound version number performs the correct routine for the obsolete version of the record. This technique allows older version records to be processed under the new version rules and layouts for fields which have been changed or expanded.

In FIG. 7, the static memory area map for record 73 is indicated by reference numeral 301. The latest or current version of that record is record 73', the static memory area of which is indicated by reference numeral 302. As described above, in the example, record 73 has been changed to add a new field G', and the changed record has been given the reference numeral 73'. Record 73, read from the source data file 17 by the Read Record Routine 101, is stored in the input buffer area 320 of memory 298.

Referring to FIGS. 12 and 15, version processing of detail records is carried out by blocks 217–224 of the Detail Record Routine. Decision block 216 determines that the version "01" of input record 73 is not the current version for that record. Accordingly, block 217 moves the input record stored in the input buffer area 320 (FIG. 15) to the correct version map for this input record which is the work area map 311 for record 73. Then, in block 218, a check is made to determine if free space for the record 73 is being used. As is stated above, the work area 311 indicates the size of the fields and the length of the reserve area for the current version of the detail header record 73. In the example, it is assumed that record free space is not being used, and thus, flow proceeds to block 219 which initializes a blank work area 312 of memory 298 with all default values for the current version 73' of the record.

To initialize the record, the default values for the record current version 73' in static memory area map 302 (FIG. 7) are read out and moved, or copied, to the blank work area 312 (FIG. 15) so that work area 312 contains the default values in fields A'–G' for the current record version 73'.

Then, in block 220 (FIG. 12), the data contained in the data fields A–F of the input record 73 in work area 311 are moved to corresponding data fields A'–F' in work area 312, as represented by arrows 324. The fields of the record being transitioned in work area 312 appear as shown by duplicated work area 312, which has been given the reference number 312', which represents the input record after it has been transitioned to the current version. Work area 312 and the "duplicated work area" 312' are the same work area, at different times during the record transitioning process. Note that in the current version of the record shown in duplicated work area 312' field G' has been initialized with the default value for the current record version 73'. The resulting final record, after the data in fields A'–F' of the most current version have been replaced by the data in fields A–F of the input record, is as shown in duplicated work area 312'. Note that the field names of the record in work area 312' are A, B, C, D, E, F and G'. Also, the data in corresponding fields, such as fields A and A', are the same. As is stated above, once a record is published, a field of that record does not change from version to another version of that record.

Figure 16:
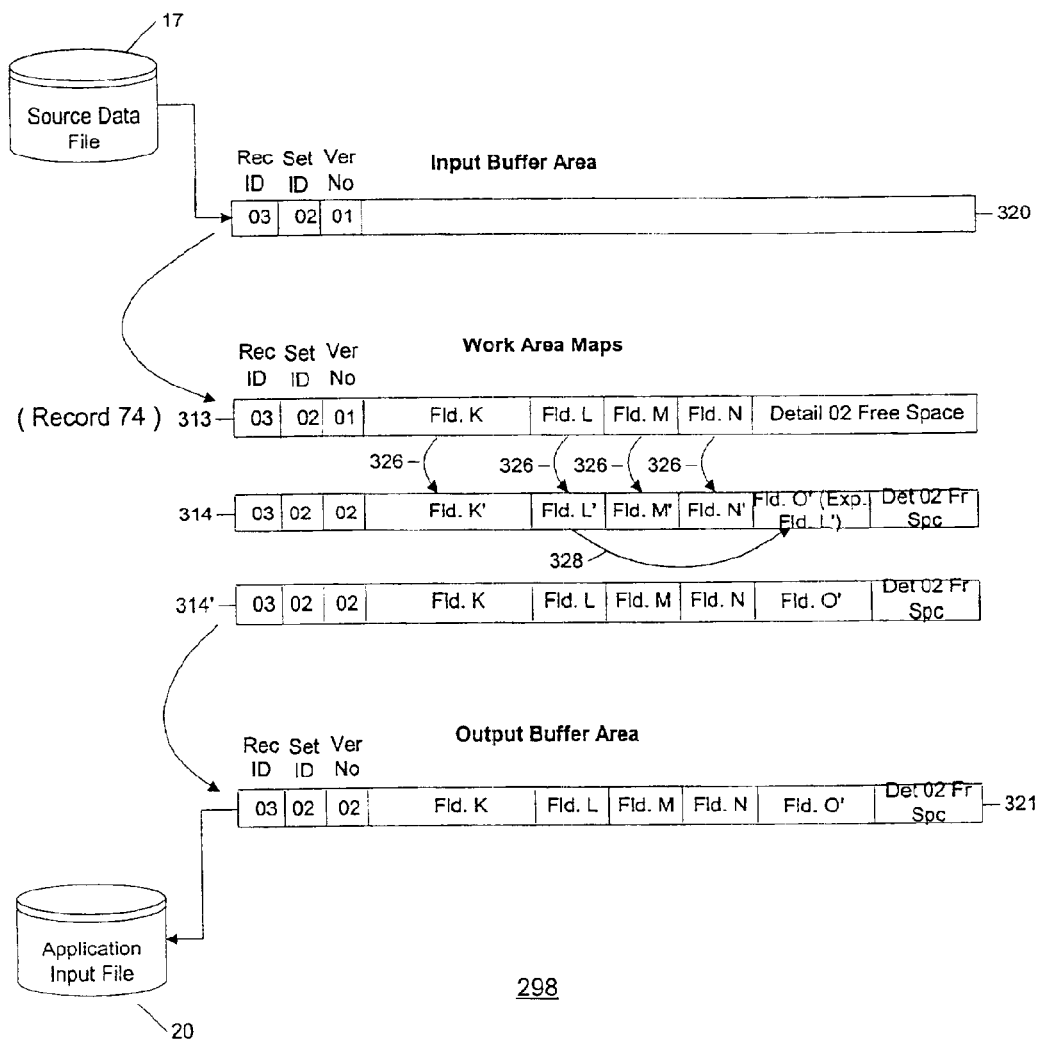

Decision block 221 (FIG. 12) determines if there is a need to reformat old fields to current version fields. In the present example, reformatting of the fields is not necessary, and so the transitioned record, (represented by the record contained in duplicated work area 312' in FIG. 15), is moved to the output buffer area 321, block 222. Then, the Write Record Routine is called, block 223, to write the record to the application input file 20 (FIG. 15). Referring to FIGS. 7, 12 and 16, the processing of record 74 is similar to the processing of record 73 described above. As shown in FIG. 16, the record 74 is identified as detail record type 03, record set ID 02, version 01. The static memory area map for record 74 is indicated by reference numeral 303 in FIG. 7. The latest or current version of that record is record 74', the static memory area of which is indicated by reference numeral 304. As described above, in the example, record 74 has been changed to expand field L by creating a new field O', and the changed record has been given the reference numeral 74'.

Referring to FIGS. 12 and 16, record 74, read from the source data file 17 by the Read Record Routine 101, is stored, initially, in the input buffer area 320 of memory 298. Block 217 (FIG. 12) moves the input record stored in the input buffer area 320 to the correct version map for this input record which is the work area map 313 for record 74. Then, in decision block 218, a check is made to determine if free space for the record 73 is being used. As is stated above, the work area 313 indicates the size of the fields and the length of the reserve area for the current version of the detail header record 73. In the example, it is assumed that record free space is not being used, and thus, flow proceeds to block 219 which initializes a blank work area 314 with all default values for the current version 74' of the record.

To initialize the record, the default values in static memory area map 304 (FIG. 7) are read out and moved, or copied, to the blank work area 314 (FIG. 16) so that work area 314 contains the default values in fields K'–O' for the current record version 74' stored in corresponding fields K'–O' of the work area 314. Then, in block 220 (FIG. 12), the data contained in the data fields K–N of the input record 74 in work area 313 are moved to corresponding data fields K'–N' in work area 314, as represented by arrows 326. The fields of the record being transitioned in work area 314 appear as shown by duplicated work area 314' which represents the input record after it has been transitioned to the current version. Work area 314 and the "duplicated" work area 314' are the same work area, but at different times during the record transitioning process. Note that in the current version of the record shown in (duplicated) work area 314' field 0' has been initialized with the default value for the current record version 74'.

In this example, block 221 (FIG. 12) determines that it is necessary to reformat field L to the current version field O'. This includes moving the data in field L to field O', as represented by the arrow 328 and filling unused portions of the field O'. The handling of transition versions is based on rules or program logic in the module. These rules move the data in data field L to data field O' because data field O' exists only on a newer version of the record. If the current version of the record were being processed, data field O' would already be populated. Because a record is being transitioned from a previous version, the program uses the rules for the transition and the program logic behind them to provide the transfer of data from data field L to data field O'.

Depending upon the type of data contained in an expanded field, such as field L, reformatting can include entering spaces for a character field, entering zeros for a numeric field, etc.

The resulting final record, after the data in fields K'–N' of the most current version have been replaced by the data in fields K–N of the input record, and after the data in field L has been copied to the new field O', is as shown in "duplicated" work area 314'. Note that the field names of the record in "duplicated" work area 314' are K, L, M, N and O'. Also, the data in corresponding fields, such as fields L and L', are the same. As is stated above, once a record is published, a field of that record does not change from version to another version of that record.

After the record in transition has been reformatted, the transitioned record, (represented by the record contained in "duplicated" work area 314'), is moved to the output buffer area 321, block 222. Then, the Write Record Routine is called, block 223, to write the record to the application input file 20 (FIG. 16).

Referring to FIG. 12, in the event that a new field represents an old field with new attributes, the old field is transitioned, in block 224, into the new field after the move. Special consideration in the code is necessary if the new field is in another record.

If decision block 218 determines that free space is being used, an Error Routine is run, block 225, and the run is stopped, block 226.

If decision block 212 determines that the record set identification number is not a valid number, an Error Routine is run, block 225, and the run is stopped, block 226.

If decision block 215 determines that the record version number is not a valid number, an Error Routine is run, block 225, and the run is stopped, block 226.

If the detail record to be processed is the current version of the record, such as detail records 73', 74', 75 or 78, the record is Processed by blocks 227, 228 and 223 in a similar manner of the file header record as described above.

Write Record Routine

Referring to FIG. 13, the Write Record Routine 105 is called by the Version Validation and Reformat Routines (blocks 176–180 FIGS. 11 and 12). Each validated and transitioned record is written to the application input file 20, and the process flow is returned to the Read Record Routine (block 112, FIG. 8) to read the next record in the file.

Application System

Referring again to FIG. 1, when structure editing and version transitioning has been performed on the client data file, the resultant application input file 20 is routed to the application system 24 for application specific editing and other application specific processing. The application specific editing and other processing can be carried out using conventional editing and processing routines known in the art. The application system 24 may or may not be the same system referenced in the Input Vertical Stack Process.

Because the transitioning has been carried out on the incoming transaction data, the edit program needs only to accept the current version of the files and records. The transitioning of the previous versions to the current version gives the user the ability to use earlier sets of data without moving to newer sets of data as of a given date.

Figure 17:
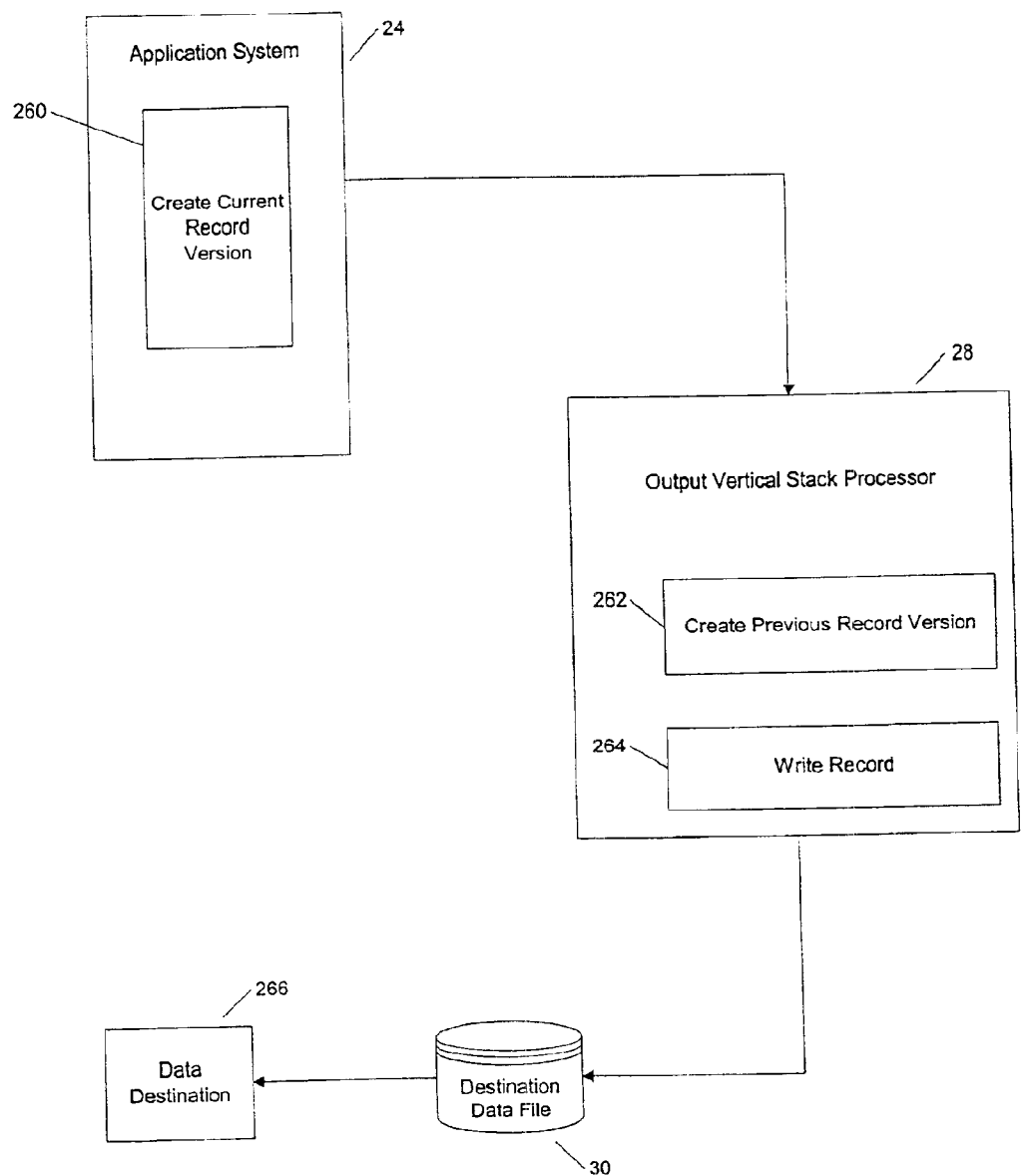
FIG. 17 is a block diagram illustrating the application system and the output vertical stack processor for producing outbound versioned records in accordance with the present invention.

FIG. 17 is a block diagram illustrating the process flow of outbound versioned records in accordance with the present invention. The application system 24 includes a Create Current Record Version Routine 260 which creates outbound data files which are needed by a client. In one embodiment, the outbound data files contain current record versions which include all of the data fields of each record but have data only in the current version data fields. The application system 24 passes the current version records to the output vertical stack processor 28 which produces destination data file 30 for transmission to a client.

The outbound data files can be client specific, permitting a client to request a "package" of records which includes only certain record types. For example, if a file includes a detail record 03, with a set of six records set ID 01, set ID 02, set ID 03, set ID 04, set ID 05 and set ID 06, the records can be requested selectively based upon need. Thus, one client can request only record set including detail records set ID 01, set ID 03, set ID 04 and set ID 06. A different client can request a record set including detail records set ID 01, set ID 05 and set ID 06. Another client can request all six records set ID 01–set ID 06. Preferably, the service provider defines which combinations or "packages" of records are available and clients can select from the choices offered.

Output Vertical Stack Process

Each outbound data file is processed by the output vertical stack processor 28, which creates a destination data file 30. The destination data file 30 is a valid vertical stack file which includes current version formatted data for each outbound data file. In addition, some destination data files 30 can include both current and previous version formatted data when required by a client.

As shown in FIG. 17, the output vertical stack processor 28 includes a Create Previous Record Versions Routine 262 and a Write Output Record Routine 264. When previous version records are required, the Create Previous Record Versions Routine 262 uses the current record version created by the application system 24 and the static memory area maps (FIG. 7) to supplement the current record version with previous version record data. In one embodiment, in which the application processor 24 creates all current and previous version data fields for each record but populates only the current version data fields, the output vertical stack processor 28 supplements the current data contained in the current record version with previous version data. Thus, the final record includes current version data and data for at least one, and preferably, all previous version records.

The Write Output Record Routine 264 writes the outbound record to a destination data file 30 for transmission to a data destination 266, which can be one of the data destinations 33–35 (FIG. 2). Although the output vertical stack processor 28 is shown and described as being separate from the application system, the output vertical stack processor 28 can be a part of the application system 24, as is represented by merging blocks 24 and 28 in FIG. 2.

Figure 18:
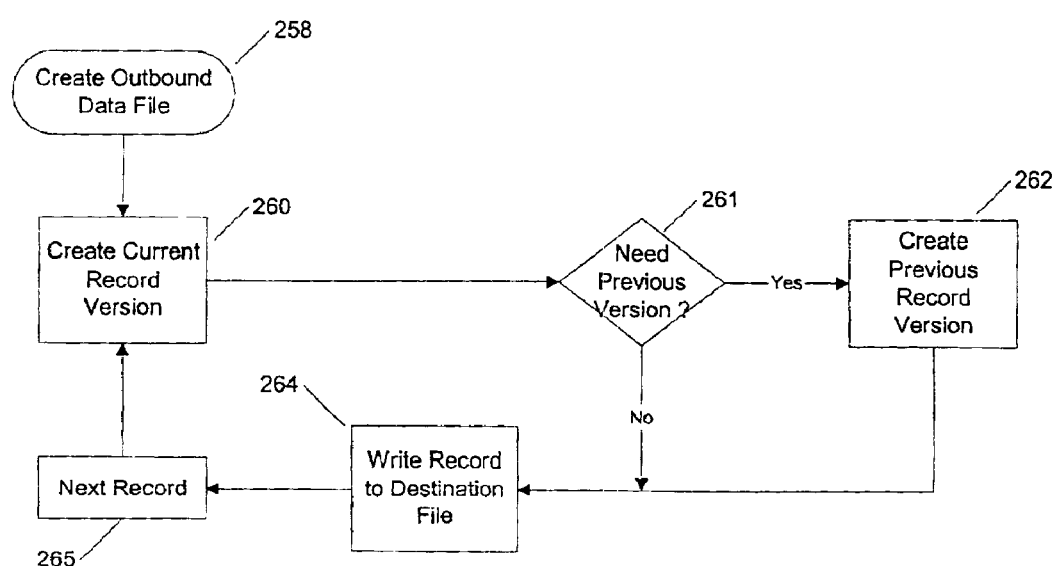
FIG. 18 is a process flow diagram for providing vertical stack processing by the output vertical stack processor in accordance with the present invention.

Referring also to FIG. 18, in order to create a data file, block 258, the application system 24 provides application formatted data to the Create Current Record Version Routine 260 of the application system. The Create Current Record Version Routine 260 creates the current version records which are passed to the output vertical stack processor 28 (FIG. 17) some of the functions of which are represented by blocks 261, 262 and 264 in FIG. 18. Decision block 261 determines whether previous record version data is requested. If so, the current record version is passed to the Create Previous Record Version Routine 262. If decision block 261 determines that no previous version record data is required, the current version record created by the application system 24 is passed to the Write Record Routine 264.

The Create Previous Record Version Routine 262 uses the current version formatted data produced by the application system 24 and uses rules to create the previous version data fields from the current version data contained in the static memory area maps (FIG. 7). The manner in which the previous version data fields are initialized with previous version data can be similar to that described above for the Detail Record Routine (FIG. 12). The outbound data file contains records such as record 74' (FIG. 6) which includes current and previous data and thus is backwards compatible with all previous versions by the content of the data fields. As is stated above, once a data field is published, it is not changed in terms of format, location or definition.

For example, if a record contains a field that has been expanded, such as field O' for record 73', FIG. 6, (and assuming that field L is not populated with data), the rules can specify that the data in field O' is to be moved to field L, by moving the proper number of left-most (or right-most) characters. Similarly, if a new field had been added to change attributes, for example assume field G' (FIG. 6) was added to record 73 (FIG. 5) to change attributes for data contained in field D, the data is moved from the current version field G' to field D, to which is moved the default attributes for field D contained in the record definition for record 73.

The resultant record which includes current record version and previous record version data is passed to the Write Record Routine 264.

In one embodiment, all previous versions of any given record type are supported in the outbound files. All fields from older versions are populated in the outbound files. In particular, records in current version can be restored to the versions being used by a client. Thus, for example, in the case where a field of current record is thirty-two bytes, and an original field was fifteen bytes, the record can be processed to move fifteen of the thirty-two bytes of data from the current field to the original fifteen bytes of data to the field being used by that client. Both fields are included in the destination data file that is transmitted to the client.

The Write Record Routine 264 writes the current record version (or the record containing both current and previous version record data) to the destination file 30 and returns the process flow to the application system 24 to process the next record in the data file and the process continues until all of the records in the data file have been processed at which time, the destination data file is transmitted to the client.

The data destination file 30 can be transmitted to one of the data destinations 33–35, block 266, through the file transmission system 16.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. For example, a data file can include any number of record types. Moreover, there can be any number of set and versions within record types. A file can have any number of levels as defined by record sets, record versions, etc. Also, the records can be in any sequence. In addition, the length of the records is limited by the transmission protocol expected to be used, and can be any length. However, the length of a record does not change and the length is the same for all records. Further, as described above, individual records can be changed both horizontally by using reserved unused space for adding or expanding fields and/or vertically by adding new records to record sets, so that the amount of data associated with a given file record can be increased without requiring all existing users having to make synchronized changes. All such changes, modifications, and alterations should therefore be seen as being within the scope of the present invention.

What is claimed is:

1. A systems for processing a data file that includes a plurality of versioned records which are of a fixed length, said system comprising:

an input vertical stack processor including a record transitioning routine for determining when a record is a previous record version from said plurality of versioned records and for transitioning the previous record version of said one record into a current record version of said one record for use in creating an application input file, wherein each of said records contain at least one field containing data and a reserve area for accommodating changes, said input vertical stack processor allowing individual records to grow horizontally by using reserved unused space and vertically by adding records to the set without requiring all existing users to make synchronized changes; and an application processor for processing said application input file.

2. The system of claim 1, wherein said record transitioning routine reformats previous version data fields of said one record to current data fields of said one record.

3. The system of claim 1, wherein said input vertical stack processor validates said one record prior to transitioning said one record.

4. The system of claim 3, wherein said input vertical stack processor includes a structure editing routine for providing file structure editing of said versioned records of said data file.

5. The system of claim 1, wherein each input record of said plurality of records includes a version number which indicates if a record is a current version or a previous version.

6. The system of claim 5, wherein said record transitioning routine uses the version number to determine if a record is a previous version.

7. A system for processing a data file that includes a plurality of versioned records which are of a fixed length, said system comprising:

an input vertical stack processor including a record transitioning routine for determining when a record is a previous record version from said plurality of versioned records and for transitioning the previous record version of said one record into a current record version of said one record for use in creating an application input file, wherein each input record of said plurality of records includes a version number which indicates if a record is a current version or a previous version, wherein said record transitioning routine uses the version number to determine if a record is a previous version; an application processor for processing said application input file; and an output vertical stack processor responsive to said application processor for producing a destination file including a plurality of records wherein each record includes at least current record versions for each record of said data file, and for writing the current record version of each record to the destination file.

8. The system of claim 7, wherein said output vertical stack processor supplements data contained in at least one record of said plurality of records with data for at least one previous version of said one record prior to writing said one record to said destination file.

9. The system of claim 8, wherein said output vertical stack processor supplements data contained in said one record with data for all of the previous versions of said one record prior to writing said one record to said destination file.

10. A system for producing a destination data file that includes a plurality of versioned records which are of a fixed length, said system comprising:

an application processor for producing the current version of each record of said data file; and an output vertical stack processor using the current version of at least one record of said data file and information contained in a static memory map to produce a record which includes current version data supplemented with data for at least one previous version of said one record, and for writing the record including current version data and previous version data to the destination data file, wherein each of said record contain at least one field containing data and a reserve area for accommodating changes, said output vertical stack processor allowing individual records to grow horizontally by using reserved unused space and vertically by adding records to the set without requiring all existing users to make synchronized changes.

11. A system for producing a destination data file that includes a plurality of versioned records which are of a fixed length, said system comprising:

an application processor for producing the current version of each record of said data file; and an output vertical stack processor using the current version of at least one record of said data file and information contained in a static memory map to produce a record which includes current version data supplemented with data for at least one previous version of said one record, and for writing the record including current version data and previous version data to the destination data file, wherein said output vertical stack processor supplements the current version data with data for all previous versions of said one record, in combination with the current version, of said one record of said data file prior to writing the record including current version data and all previous version data of said one record to the destination file.

12. A method for processing a data file that includes a plurality of input records which are of a fixed length, said method comprising the steps of:

reading at least one of said input records to obtain from said one input record, a version number for said one input record, the version number indicating whether said one input record is a current version or a previous version of said one input record;

using said version number to determine if said one input record is a current version or a previous version; and when said one input record is a previous version, transitioning said one input record to a current version of the input record by moving said one input record to a first work area of a memory, the first work area defining data fields for said one input record;

initializing a second work area of the memory with default values for the current version of said one input record, with the default values contained in data fields of the current version of said one input record; and moving data contained in the data fields of said one input record in said first memory work area to corresponding data fields of the current version of said one input record in said second memory work area, whereby said second memory work area contains said one input record transitioned to the current version of said record.

13. The method of claim 12, wherein each of said input records includes a data receiving portion and a reserve area, and including the step of determining for at least said one input record if at least a portion of the reserve area defined for said previous version of said one input record is being used, and halting processing of said data file when any portion of said defined reserve area is being used.

14. The method of claim 12, including the step of reformatting data fields of said one input record to current data fields after data contained in the data fields of said one input record in said first memory work area have been moved to corresponding data fields of the current version of said one input record in said second memory work area.

15. The method of claim 14, wherein reformatting data fields of said one input record includes moving data from a first data field in said second memory work area to a second data field in said second memory work area.

16. The method of claim 12, wherein initializing the second memory work area with default values includes the steps of reading a record definition for the current version of said one input record to obtain the default values for the current version of said one input record, and copying the default values for the current version of said one input record to said second memory work area.

17. The method of claim 12, including the step of writing the transitioned version of said one input record to an application data file.

18. The method of claim 17, and when said one input record is the current version, moving said one input record to a work area of the memory, and writing said one input record, without transitioning, to an application file.

* * * * *

UNITED STATES PATENT AND TRADEMARK OFFICE
CERTIFICATE OF CORRECTION

PATENT NO.    : 6,886,018 B1
DATED         : April 26, 2005
INVENTOR(S)   : Edward J. Boudris and Brian K. Schumacher It is certified that error appears in the above-identified patent and that said Letters Patent is hereby corrected as shown below:

Column 6,
Line 9, "as" should be -- has --.
Line 11, "or" should be -- for --.

Column 7,
Line 55, "firs" should be -- first --.

Column 8,
Line 17, "a," should be -- a --.

Column 9,
Line 14, "73" should be -- 73' --.

Column 11,
Table VII, "Detail" should be -- Batch Trailer --.

Column 13,
Table X, line 8, "12" should be -- 2 -- (under Length Type).

Column 15,
Line 17, "13-and" should be -- 13-15 and --.

Column 20,
Line 61, "Processed" should be -- processed --.

Column 23,
Line 26, "A systems…" should be -- A system --.
Line 35, "contain" should be -- contains --.

UNITED STATES PATENT AND TRADEMARK OFFICE
CERTIFICATE OF CORRECTION

PATENT NO.    : 6,886,018 B1
DATED         : April 26, 2005
INVENTOR(S)   : Edward J. Boudris and Brian K. Schumacher It is certified that error appears in the above-identified patent and that said Letters Patent is hereby corrected as shown below:

Column 24,
Lines 37-38, "record contain" should be -- records contains --.

Signed and Sealed this

Fourth Day of April, 2006

JON W. DUDAS
*Director of the United States Patent and Trademark Office*